United States Patent
Takaoka et al.

(10) Patent No.: US 10,572,171 B2
(45) Date of Patent: Feb. 25, 2020

(54) STORAGE SYSTEM

(71) Applicant: Hitachi, Ltd., Tokyo (JP)

(72) Inventors: Nobumitsu Takaoka, Tokyo (JP);
Akira Yamamoto, Tokyo (JP);
Tomohiro Kawaguchi, Tokyo (JP);
Yasuo Watanabe, Tokyo (JP);
Yoshihiro Yoshii, Tokyo (JP); Kazuki Matsugami, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 15/769,424

(22) PCT Filed: Feb. 29, 2016

(86) PCT No.: PCT/JP2016/056018
§ 371 (c)(1),
(2) Date: Apr. 19, 2018

(87) PCT Pub. No.: WO2017/149592
PCT Pub. Date: Sep. 8, 2017

(65) Prior Publication Data
US 2018/0307433 A1 Oct. 25, 2018

(51) Int. Cl.
*G06F 3/06* (2006.01)

(52) U.S. Cl.
CPC .......... *G06F 3/0641* (2013.01); *G06F 3/0608* (2013.01); *G06F 3/0644* (2013.01); *G06F 3/0653* (2013.01); *G06F 3/0659* (2013.01); *G06F 3/0673* (2013.01)

(58) Field of Classification Search
CPC .... G06F 3/0641; G06F 3/0659; G06F 3/0608; G06F 3/0644; G06F 3/0673; G06F 3/0653
See application file for complete search history.

(56) References Cited

U.S. PATENT DOCUMENTS

| 8,359,444 | B2 | 1/2013 | Arakawa |
| 8,539,148 | B1 * | 9/2013 | Chen ................ G06F 3/0608 711/112 |
| 8,799,601 | B1 * | 8/2014 | Chen ................ G06F 3/0608 711/161 |
| 9,152,325 | B2 * | 10/2015 | Islam ............... G06F 16/1748 |
| 10,001,942 | B1 * | 6/2018 | Sharma ............. G06F 3/0641 |

(Continued)

FOREIGN PATENT DOCUMENTS

JP     2011-065314 A    3/2011

OTHER PUBLICATIONS

International Search Report of PCT/JP2016/056018 dated May 17, 2016.

*Primary Examiner* — Hiep T Nguyen
(74) *Attorney, Agent, or Firm* — Mattingly & Malur, PC

(57) ABSTRACT

A storage system according to an aspect of the present invention includes one or more storage devices for storing write data to which a write request from a host computer is directed, and a storage controller that provides one or more volumes to the host computer. Further, the storage system manages the time when a write request is last received from the host computer for each partition within the volume. Then, the storage controller performs a deduplication process upon detecting the partition not receiving a write request for a predetermined time or more from the time when the write request is last received.

12 Claims, 16 Drawing Sheets

(56) References Cited

U.S. PATENT DOCUMENTS

2009/0234795 A1\* 9/2009 Haas ................. G06F 16/24564
2011/0066666 A1   3/2011 Takaoka et al.
2012/0110045 A1   5/2012 Takaoka et al.

\* cited by examiner

FIG. 4
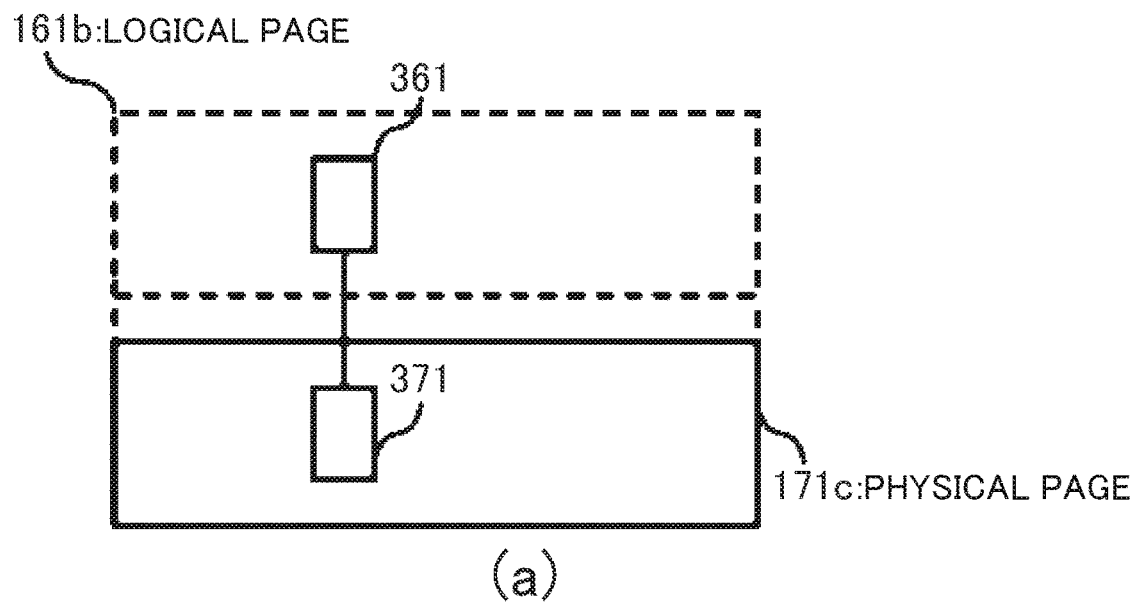
(a)
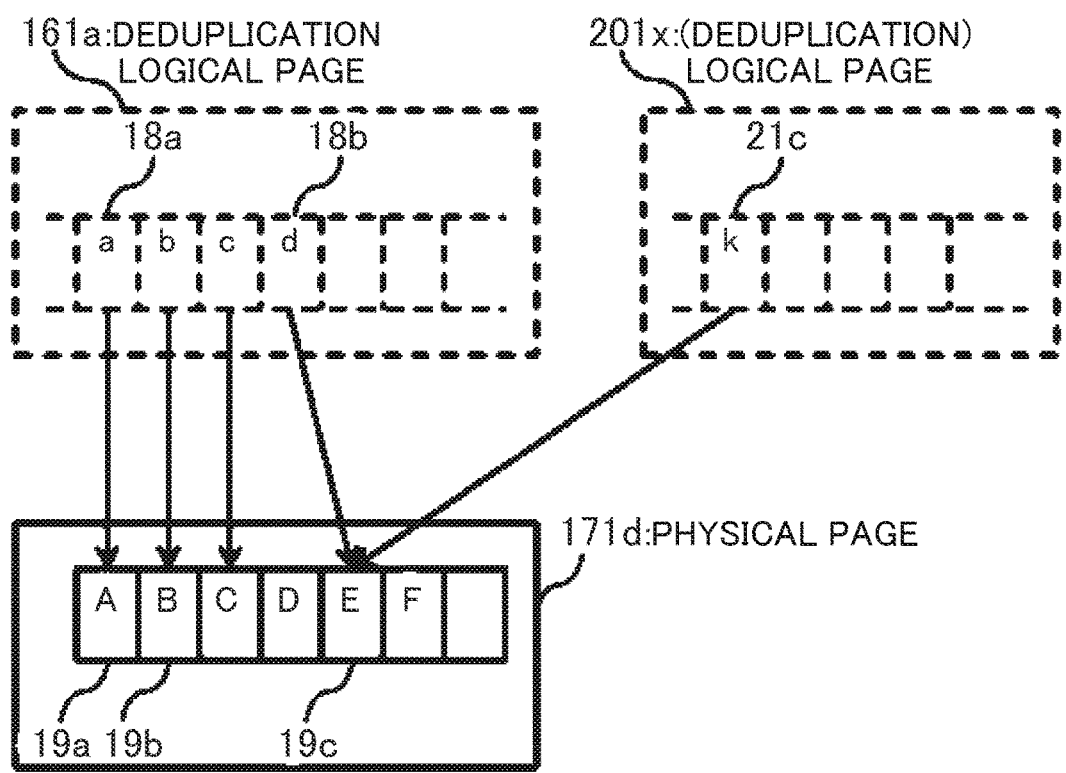
(b)

FIG. 5

126: LOGICAL PAGE MANAGEMENT TABLE

| VIRTUAL VOLUME | LOGICAL PAGE | DEDUPLICATION | PHYSICAL PAGE | STATE | LAST WRITE TIME | NUMBER OF DEDUPLICATED BLOCKS |
|---|---|---|---|---|---|---|
| 16 | 161a | VALID | NULL | Q | NULL | 0 |
| 16 | 161b | INVALID | 171b | X | 12/10 14:30 | 0 |
| 16 | 161c | INVALID | 171c | P | 12/15 20:00 | 0 |
| 20 | 201a | VALID | NULL | Q | NULL | 100 |
| 1261 | 1262 | 1263 | 1264 | 1265 | 1266 | 1267 |

FIG. 6

127: MAPPING TABLE

| VIRTUAL VOLUME | LOGICAL PAGE | DEDUPLICATION BLOCK | FINGERPRINT | PHYSICAL PAGE | DATA BLOCK | REDUCED FLAG |
|---|---|---|---|---|---|---|
| ... | ... | ... | ... | ... | ... | ... |
| 16 | 161a | a | 11111111 | 171d | A | FALSE |
| 16 | 161a | b | 22222222 | 171d | B | FALSE |
| 16 | 161a | c | 33333333 | 171d | C | FALSE |
| 16 | 161a | d | 44444444 | 171d | E | FALSE |
| ... | ... | ... | ... | ... | ... | ... |
| 20 | 201x | k | 44444444 | 171d | E | TRUE |
| ... | ... | ... | ... | ... | ... | ... |
| | | | | | | |
| 1271 | 1272 | 1273 | 1274 | 1275 | 1276 | 1277 |

FIG. 7

128:POOL MANAGEMENT TABLE

| PHYSICAL PAGE | USE STATE | LOGICAL PAGE |
|---|---|---|
| 171a | UNUSED | NULL |
| 171b | LOGICAL PAGE | 16b |
| 171c | LOGICAL PAGE | 16c |
| 171d | DATA BLOCK | NULL |
| 171e | UNUSED | NULL |

129:SEARCH TABLE

| FINGERPRINT | DEDUPLICATION BLOCK |
|---|---|
| ... | ... |
| 11111111 | 16:a |
| ... | ... |
| 22222222 | 16:b |
| ... | ... |
| 33333333 | 16:c |
| ... | ... |
| 44444444 | 16:d,20:k |
| ... | ... |

1291      1292

130:DEREFERENCE TABLE

| PHYSICAL PAGE | DATA BLOCK | DEDUPLICATION BLOCK |
|---|---|---|
| ... | ... | ... |
| 171d | A | 16:a |
| 171d | B | 16:b |
| 171d | C | 16:c |
| 171d | E | 16:d |
| ... | ... | ... |
| 1301 | 1302 | 1303 |

131:FOLLOWING POINTER

STORAGE SYSTEM

TECHNICAL FIELD

The present invention relates to a storage system.

BACKGROUND ART

A storage system includes a plurality of storage devices for storing data as well as a storage controller for controlling the storage devices, and is intended to provide high-capacity data storage space to a host computer.

The storage system is required to store a large amount of data at a low cost. In order to satisfy this requirement, there is known a technique that reduces the size of write data received from a host and stores the write data in a storage device. When write data is reduced in size and then stored in the storage device, the data storage costs (the bit cost of the storage medium, the power consumption cost of the storage device, or other costs) can be reduced. In order to reduce the data size, there is a technique that reduces the data size while maintaining the meaning of the data by using a lossless compression algorithm. This process is referred to as "lossless compression" or "compression".

When data is compressed and stored in a storage device, the overhead of the compression process occurs in writing and the overhead of the decompression process of compressed data occurs in reading, which may result in a reduction in access performance. In other words, the reduction in the amount of stored data and the access performance have a tread off relationship. In order to avoid this, there is a technique that selectively performs data compression. For example, Patent Literature 1 discloses a method that, in a storage system that manages a plurality of storage tiers, reduces the amount of stored data while preventing the reduction in access performance, for example, by compressing and storing data to be moved to a lower tier.

Further, as another technique for reducing the amount of data to be stored, there is also a deduplication technique. For example, when a storage system detects that a plurality of pieces of data having the same content are present in the storage system, the technique leaves one of the pieces of data in a storage device within the storage system, and does not store the remaining data in the storage device. The amount of write data stored in the storage device can be reduced to less than the amount of write data received from the host by using either the deduplication technique or the lossless compression technique. Thus, in a broad sense, it can be said that the deduplication technique is also one of the compression techniques.

CITATION LIST

Patent Literature

Patent Literature 1: U.S. Pat. No. 8,359,444

SUMMARY OF INVENTION

Technical Problem

When data is compressed, the compression ratio (or the amount of data shrinkage) can vary depending on the data content. For this reason, there is a possibility that the amount of data to be stored in the storage device is hardly reduced although compression or deduplication process is applied to the data. In this case, the access performance is also reduced and the storage cost of data is not reduced as well. In order to provide a high performance storage system at low bit cost, it is necessary to prevent the occurrence of such a situation.

Solution to Problem

A storage system according to an aspect of the present invention includes one or more storage devices for storing write data to which a write request from a host computer is directed, and a storage controller that provides one or more volumes to the host computer. The storage system holds the last write time, which is the time when a write request is last received from the host computer, for each partition within the volume. Then, when detecting a partition on which write request is not received for a predetermined period or more from the last write time, the storage controller performs a deduplication process. Further, with respect to a partition with a low deduplication ratio as a result of the deduplication process of the partition, the storage controller performs a process for returning the partition to the state in which the deduplication process is not performed.

Advantageous Effects of Invention

According to the present invention, it is possible to provide a high performance storage device at low bit cost.

BRIEF DESCRIPTION OF DRAWINGS

FIG. 4 is a diagram showing the mapping relationship between a logical page and a physical page.

FIG. 5 is a configuration example of a logical page management table.

FIG. 6 is a configuration example of a mapping table.

FIG. 7 is a configuration example of a pool management table.

FIG. 8 is a configuration example of a search table.

DESCRIPTION OF EMBODIMENTS

Figure 1:
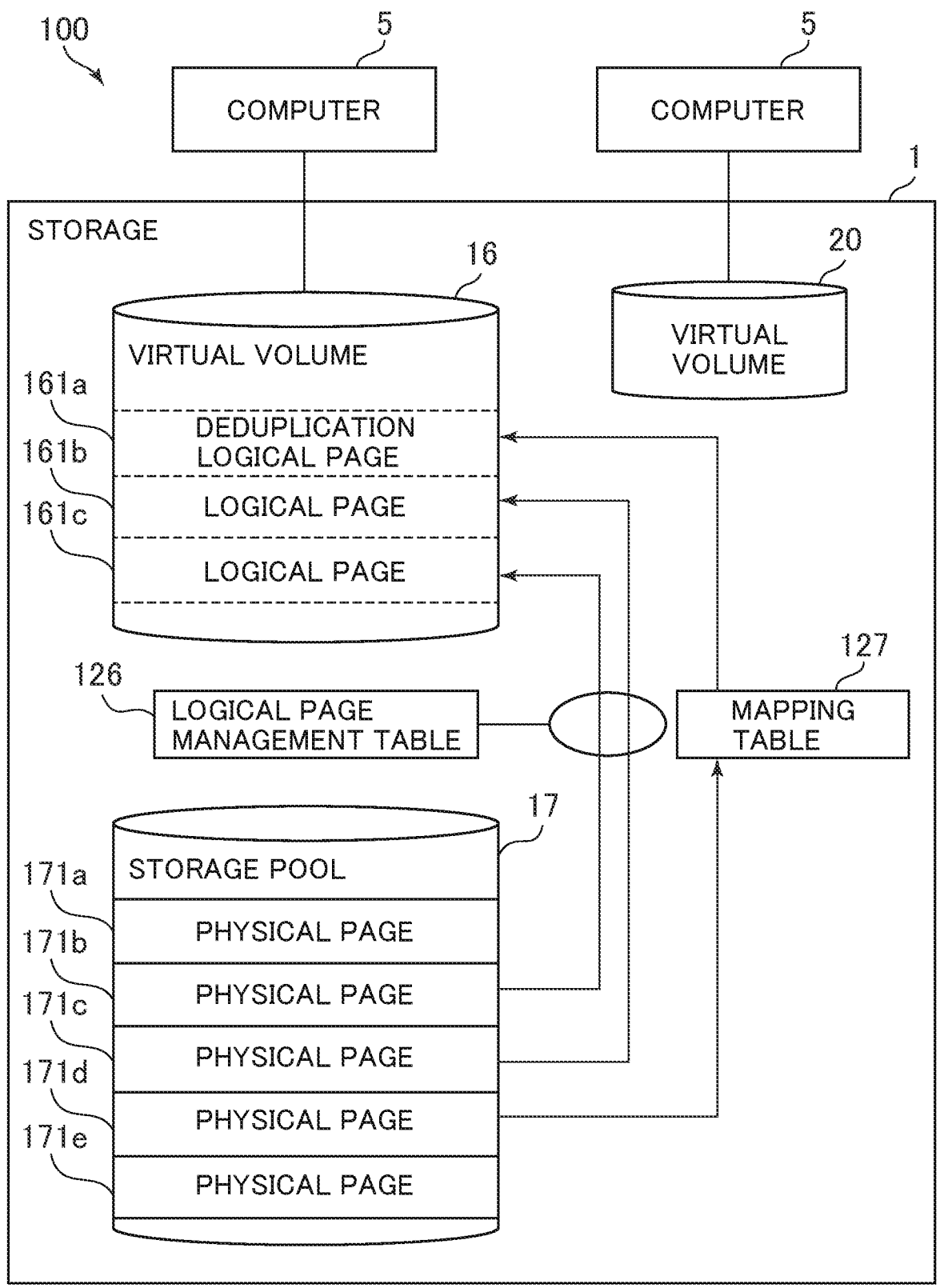
FIG. 1 is a logical configuration diagram of a computer system including a storage system according to an embodiment.

Hereinafter, some embodiments will be described with reference to the accompanying drawings.

Note that in the following embodiment, the processing performed within a storage system may be described using "program" as the subject of a sentence. Actually a processor (CPU) of the storage system executes a program to perform the process described in the program, and so the subject of the process is the processor (CPU). However, the content of the process may be described using program as the subject of the sentence in order to prevent the description becoming too long. In addition, part or whole of the program can be implemented in dedicated hardware. Further, various programs described below can be provided by a program distribution sever or a storage medium that the computer can read, and can be installed in each device that performs each program. The storage medium that the computer can read is a non-transitory computer readable medium such as, for example, IC card, SD card, or a non-volatile storage medium such as DVD.

Before giving a description of an embodiment, various terms used in the embodiment are described.

"Volume" means storage space that a target device such as a storage system or a storage device provides to an initiator device such as a host computer. When the initiator device issues a data write request to an area on the storage space, the data is stored in the area on the target device mapped to the area. The storage system according to the present embodiment provides a virtual volume, which is formed by the so-called Thin Provisioning technique, to the host as a volume. The virtual volume is such that the storage device is not mapped to the area on the storage space in the initial state (immediately after the virtual volume is defined). Once the initiator device (host) issues a write data request to an area on the storage space, the storage device dynamically determines the storage device to be mapped to the area.

"Deduplication process" is a process that, when a plurality of pieces of data having the same content are present in the storage system, leaves only one in the storage system and removes other data from the storage system. A process for determining whether there is data having the same content in the storage system is referred to as a "duplication determination" process. It should be noted that, unless otherwise stated, the deduplication process is the process that includes the duplication determination process.

In the storage system according to the embodiment described below, the duplication determination is performed for each data of a given size that is called a deduplication block. In the following embodiment, a description is given of an example in which the size of the deduplication block is 8 KB. However, the deduplication block can also be set to a size other than 8 KB. The data having the same content is referred to as the "duplicate data".

The determination process will take a long time if two data are compared bit by bit or byte by byte in deduplication determination. For this reason, in general a device that performs duplication determination performs a predetermination operation (for example, an operation using the hash function, or the like) on the data to be compared, and generates a feature amount with a small size (for example, no larger than 8 bytes) to perform the deduplication determination by using the generated feature amount. In the following embodiment, the feature amount generated from data is referred to as "fingerprint". The fingerprint may also be abbreviated as FP.

In the embodiment described below, when the value of FP calculated from data A is H, the value H is referred to as FP of data A. Conversely, the data A may be referred to as "data having FP H". Further, the area (deduplication block) in which data A is written may also be referred to as "area (deduplication block) having FP H".

In the present embodiment, "collision" means that when each FP is generated by applying a predetermined operation to each of a plurality of different data, the generated FPs are the same. Collisions can occur when feature amounts with a small size are calculated using the hash function or other mathematical functions.

"Deduplication ratio" is the index value that indicates the efficiency of reducing the amount of storage area consumption by the deduplication process. For example, the deduplication ratio is the value expressed by the ratio between the amount of data written to the volume of the storage device, and the amount of storage area that the storage system used (consumed) for data storage. In the deduplication process, when a large amount of data having the same content are stored, only one is written to the storage area of the storage device (the storage area is consumed) and the other data are not written to the storage area (the storage area is not consumed). As a result, the efficiency of reducing the amount of storage area consumption is increased.

Embodiment (1) Summary of Invention

The outline of the deduplication method that a storage system according to an embodiment of the present invention performs is first described with reference to FIGS. 1, 2, and 4. FIG. 1 is a diagram showing the configuration of a virtual volume that the storage system according to the embodiment of the present invention provides to a computer.

A storage system 1 includes a plurality of storage devices (not shown in FIG. 1), and stores write data from a host computer 5 (hereinafter referred to as "computer 5") into the storage device. The storage device provides a storage area of a predetermined size to the storage system 1. However, the storage system 1 does not provide the storage space provided by the storage device directly to the computer 5. The storage system 1 provides one or more virtual storage spaces, which are different from the storage space that the storage device has, to the computer 5. The virtual storage space is referred to as "virtual volume". FIG. 1 shows an example in which two virtual volumes (virtual volume 16, virtual volume 20) are provided to the computer 5.

The storage system 1 manages the storage space of the virtual volume by dividing it into a plurality of segments of a predetermined size (as an example, 42 MB). In the present embodiment, this segment is referred to as "logical page". A unique identifier is added to each logical page within the virtual volume. This identifier is referred to as the logical page identifier (or the logical page number).

The virtual volume is the volume formed by using a known technique such as Thin Provisioning. Upon reception of an access request directed to the logical page of the virtual volume, the storage system 1 dynamically allocates (maps) the storage area of the storage device to the logical page. In other words, until an access request to each logical page is received from the computer 5, the storage area is not allocated to the logical page.

The storage system 1 also has a managing concept for managing the storage area (the storage area that the storage device provides) that is to be allocated to the logical page. This is referred to as "storage pool" or "pool". In FIG. 1, the storage pool is expressed as a cylindrical object 17. The storage system 1 segments the storage area of the pool into areas of the same size as the logical page (or areas of a size larger than the logical page), and manages the segmented areas by adding an identifier to each area. This segmented area is referred to as "physical page", and the identifier added to the physical page is referred to as "physical page identifier" or "physical page number".

When receiving a write request to the virtual volume from the computer 5, the storage system 1 converts the address of the write target area included in the write request into a logical page number, and identifies the logical page including the write target area. When the physical page is not allocated to the identified logical page, the storage system 1 selects an unused physical page (a physical page that is not yet allocated to the logical page) within the pool 17, and allocates (maps) the selected physical page to the logical page to be accessed. The write data from the computer 5 is stored in the physical page mapped to the logical page to be accessed.

Further, the storage system 1 stores the correspondence (mapping) between the logical page and the physical page allocated to the logical page into a logical page management table 126. When receiving a read request to the logical page, the storage system 1 identifies the storage area allocated to the logical page by referring to the logical page management table 126, and reads the data from the identified storage area.

The storage system 1 according to the present embodiment determines that, of the logical pages to which write data is written from the computer 5, a logical page corresponding to a given condition is treated as a deduplication process target, and performs the deduplication process on the particular logical page. The given condition is for example a logical page with low write frequency, and more specifically, is a logical page to which write data is not written for a predetermined time or more. The logical page on which the deduplication process was performed is referred to as "deduplication logical page". Conversely, a logical page other than the deduplication logical page may be referred to as "normal logical page".

FIG. 4 is a conceptual diagram showing a state in which a physical page is allocated to a normal logical page, as well as a state in which a physical page is allocated to a deduplication logical page. FIG. 4(*a*) shows a state in which a physical page is allocated to a normal logical page. One physical page 171*c* is allocated to one normal logical page 161*b*. For example, when the computer 5 issues a request to the storage system 1 to write data to an area 361 at the k-th byte from the top of the normal logical page 161*b*, the storage system 1 stores the data specified by the write request into the area 371 at the k-th byte from the top of a physical page 171*c* that is allocated to the normal logical page 161*b*. This relationship is maintained, so that when managing the mapping between the normal logical page and the physical page, the storage system 1 can only manage the physical page number of the physical page allocated to the logical page for each logical page.

FIG. 4(*b*) shows a state in which a physical page is allocated to a deduplication logical page. The storage system 1 segments the area within the logical page into partial areas of a predetermined size (for example, 8 KB), and allocates the area of the physical page for each partial area. In the present embodiment, the deduplication determination is performed for each partial area, so that the partial area is referred to as "deduplication block". On the other hand, the area on the physical page allocated to the deduplication block is referred to as "data block".

Note that when the normal logical page is treated as a deduplication logical page, the physical page having been allocated to the normal logical page is removed (to a state in which the physical page is not allocated). Then, the data having been stored in the physical page is moved to the area (data block) on the physical page that is to be allocated to the deduplication block. The data block is the area on the physical page belonging to the pool 17. The mapping information of the deduplication block and the data block is stored in a mapping table 1267 described below.

In the deduplication process that the storage system 1 performs, data are compared for each deduplication block. The outline of the deduplication process is described with reference to FIG. 4(*b*). In FIG. 4(*b*), reference numeral 161*a* denotes a deduplication logical page, and a data block 19*c* within a physical page 171*d* is allocated to a deduplication block 18*b*. Here, it is assumed that the storage system 1 performs the deduplication process on a logical page 201*x*. The storage system 1 compares the data written to a deduplication block 21*c* of the logical page 201*x* with the content of the data stored in each data block of the physical page 171*d*. As a result of the comparison, when the data written to the deduplication block 21*c* is the same as the data stored in the data block 19*c*, the storage system 1 allocates the data block 19*c* to the deduplication block 21*c*. Then, the storage system 1 does not newly write the data, which is written to the deduplication block 21*c*, to the physical page 171*d*. As a result, the data block 19*c* is allocated to two deduplication blocks (18*b* and 21*c*). In the present embodiment, the state in which a data block is allocated to a plurality of deduplication blocks is expressed as "a data block is shared by a plurality of deduplication blocks" or "a plurality deduplication blocks share one data block".

With this configuration, when receiving a read request either to the deduplication block 18*b* or to the deduplication block 21*c* from the computer 5, the storage system 1 reads the data A from the data block 19*c* and returns to the computer 5. Further, there is no need to allocate different data blocks to the block deduplication block 18*b* and the deduplication block 21*c*, which actually allows for a reduction in the amount of data stored in the storage pool 17 (in other words, the amount of storage area consumption in the storage device) to ½ of its original amount. If n deduplication blocks share one data block, the amount of storage area consumption is reduced to 1/n.

In this way, in the storage system 1 according to the present embodiment, the logical page may be treated as a deduplication logical page or treated as a normal logical page. The storage system 1 stores information on the state of each logical page to manage which state that each logical page is in. Each state of the logical page is described with reference to FIG. 2.

Figure 2:
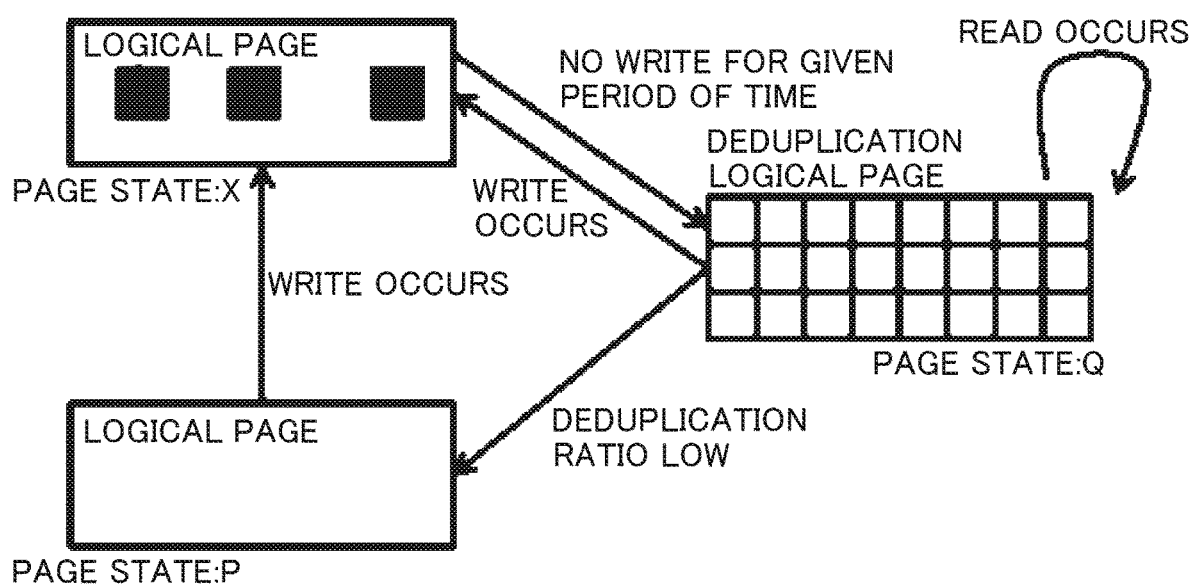
FIG. 2 is a diagram showing the state transition of a logical page.

FIG. 2 is a diagram showing the state transition of a certain logical page. In the initial state (immediately after a virtual volume is defined and no physical page is allocated to the logical page), the state of the logical page is P. When data is written from the computer 5 to the logical page, the storage system 1 changes the state of the logical page to X.

When a write request to the logical page whose state is X did not come from the computer 5 for a predetermined time or more, the storage system 1 changes the state of the logical page to Q. The logical page whose state is Q is a deduplication logical page on which the deduplication process is to be performed. When a write request comes from the computer 5 to the logical page whose state is Q (deduplication logical page), the storage system 1 changes again the state of the logical page to X. This is because the overhead of the process such as deduplication determination increases when data is stored to the deduplication logical page, resulting in a reduction in access performance.

When a write request does not come from the computer 5, the state (state Q) of the deduplication logical page is basically maintained. However, when the effect of reducing the amount of storage area consumption in the deduplication logical page is small, for example, when most of the data written in each deduplication block of the deduplication logical page are different from other data, it does not contribute to the reduction in the bit cost of the storage system 1 and may even lead to a reduction in access performance. For this reason, when there is a deduplication logical page in which the effect of reducing the amount of storage area consumption is small, the storage system 1 changes the state of the deduplication logical page from Q to P.

Upon determination of the deduplication logical page whose state should be changed from Q to P, the storage system 1 uses the deduplication ratio of the logical page. Note that the "deduplication ratio of the logical page" in the present embodiment is defined by the following equation.

It is assumed that the number of deduplication blocks within the logical page is P, and of the deduplication blocks of the logical page (deduplication logical page), the number of deduplication blocks to which data blocks, which have been allocated to other deduplication blocks, are allocated is W (in other words, of the data blocks allocated to the deduplication logical page, the number of data blocks shared by a plurality of deduplication blocks is W). Note that the number of deduplication blocks P within the logical page is a fixed value that can be obtained by dividing the logical page size (for example, 42 MB) by the size of the deduplication block (for example, 8 KB). At this time, the deduplication ratio D of the logical page is expressed by the following equation: $D=W \div P$ Since P is a fixed value, the deduplication ratio D increases when W is large. Thus, when D is large (or close to 1), it means that the amount of storage area consumption in the storage device is small (the effect of reducing the storage area by deduplication is high). On the other hand, when D is small (or close to 0), it means that the effect of reducing the storage area by deduplication is small. In the present embodiment, when there is a deduplication logical page whose deduplication ratio is less than a predetermined threshold, the storage system 1 changes the state of the deduplication logical page from Q to P.

When the state of the logical page is changed from Q to P, the storage system once reads the data of the logical page into a temporary storage area such as a cache memory within the storage system 1, allocates a new physical page to the logical page, and writes the data again to the allocated physical page to change to the state in which the deduplication process is not performed. The storage system according to the present embodiment provides a balance between high access performance and low bit cost by limiting logical pages as the targets of the deduplication process, in consideration of the access frequency of logical pages as well as the reduction efficiency of the amount of storage area consumption.

Note that the logical page of the state P and the logical page of the state X are different in the following point. The logical page of the state X can be changed to the state Q. More specifically, when a write request does not come from the computer 5 for a predetermined time or more, the state of the logical page is changed to Q. On the other hand, in the case of the logical page of the state P, the state is not changed to Q. This is because, as a result of the determination that the effect of reducing the amount of storage area consumption is small, the logical page of the state P is the logical page whose state is changed from Q to P (or is the logical page in which write data has never been written by the computer 5 and to which no physical page is allocated). It is apparent that the effect of reducing the amount of storage area consumption is small (or none) even if the state of such a logical page is changed to Q, so that the storage system 1 does not change the state of the logical page of the state P to Q. This helps to prevent frequent changes in the state of the logical page (and so prevent the increase in the processing overhead).

(2) System Configuration

Figure 3:
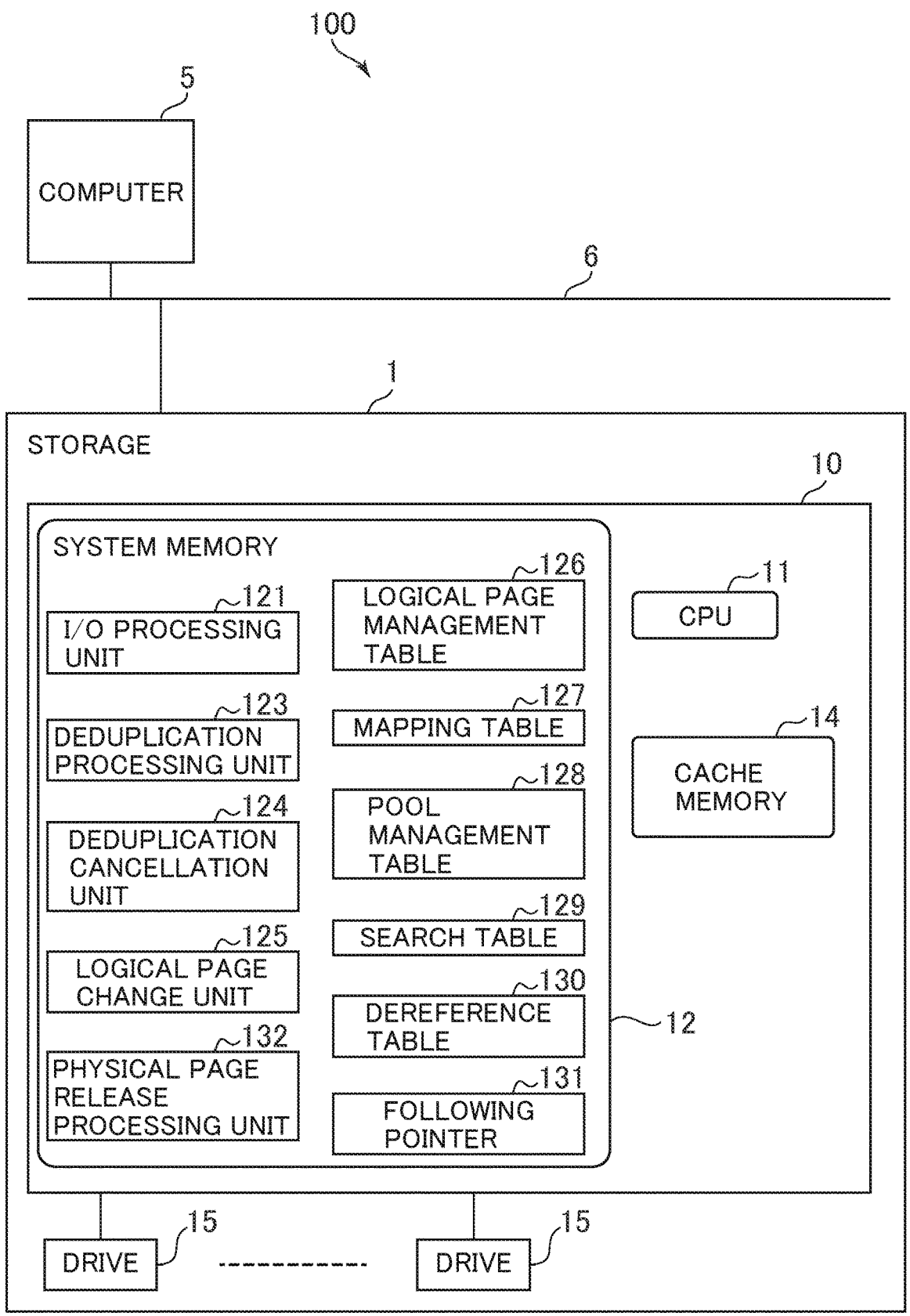
FIG. 3 is a block diagram of the storage system.

FIG. 3 shows a hardware configuration example of the computer system including the storage system 1 according to the present embodiment. The storage system 1 includes a storage controller 10 and a plurality of storage devices 15 connected to the storage controller 10.

The storage device 15 is used in the storage system 1 to store write data from an upper device such as the computer 5. For example, HDD (Hard Disk Drive) that uses a magnetic disk as a storage medium, or SSD (Solid State Drive) that uses a non-volatile semiconductor memory, such as a flash memory, as a storage medium is used for the storage device. In the present embodiment, the storage device 15 may also be expressed as "drive 15". As an example, the storage device 15 is connected to the storage controller 10 by a transmission line (SAS link) that conforms to the SAS (Serial Attached SCSI) standard, or a transmission line (PCI link) that conforms to the PCI (Peripheral Component Interconnect) standard.

The storage controller 10 at least has a processor (also referred to as CPU) 11, a system memory 12, a cache memory 14, and an interface (not shown) to connect to SAN (Storage Area Network) 6. As an example, the SAN 6 is a network formed by using a fiber channel.

The processor 11 performs various types of control on the storage system 1. The system memory 12 is used for storing programs that the CPU 11 executes as well as management information that the CPU 11 uses to execute the programs. On the other hand, the cache memory 14 is used for temporarily storing the write data received from the computer 5 as well as the read data read from the storage device 15.

A volatile storage medium such as DRAM or SRAM is used for the system memory 12 and the cache memory 14. As another embodiment, it is possible to configure the cache memory 14 with a non-volatile storage medium. Furthers, when a volatile storage medium is used for the cache memory 14, an auxiliary power supply such as a battery can be added to the storage system 1 to maintain the stored content of the cache memory 14 at the time of the power outage.

Further, as still another embodiment, the storage system 1 may not include two types of memories (the system memory 12 and the cache memory 14). In other words, the storage system 1 can be configured to include only one type of memory. In this case, the programs, management information, and write data are stored in the same memory.

The computer 5 is an access request source to the storage system 1. The computer 5 is a general-purpose computer such as PC (personal computer), and at least has a processor and a memory (not shown). The processor executes a program such as an application program that issues an I/O request to the virtual volume provided by the storage system 1.

(3) Management Information

Next, the management information and program content that the storage system 1 has will be described. The memory 12 of the storage system 1 stores at least six types of management information, including a logical page management table 126, a mapping table 127, a pool management table 128, a search table 129, a dereference table 130, and a following pointer 131. The content of various types of management information will be described below.

FIG. 5 shows the configuration of the logical page management table 126. The logical page management table 126 is a table for managing the state of each logical page, in which the state and attribute information of each logical page is stored. The information stored in each column of the logical page management table 126 will be described below.

Virtual volume 1261 and logical page 1262 respectively store the identifier of the virtual volume belonging to the logical page and the identifier of the logical page.

Deduplication 1263 stores "valid" or "invalid". When "valid" is stored in the deduplication 1263 of a certain record, this means that the logical page managed in the record is deduplication logical page. When "invalid" is stored in the deduplication 1263, this means that the logical page managed in the record is normal logical page.

Physical page 1264 stores the identifier of the physical page allocated to the logical page. When the physical page is not allocated to the logical page, NULL is stored.

Note that in general non-negative integers are used for the identifiers of virtual volumes and logical pages. However in FIG. 5, for the purpose of convenience, the reference numbers added to the virtual volumes, the reference numbers added to the logical pages, and the reference numbers added to the physical pages, which are shown in FIG. 1 and other figures, are stored in each of the columns of the virtual volume 1261, the logical page 1262, and the physical page 1264. Similarly, with respect to the management information described below, the reference numbers of the virtual volumes, the logical pages, the physical pages, and the like, shown in FIG. 1 and other figures are stored in each of the columns for storing identifiers of virtual volumes, logical pages, physical pages, and the like.

State 1265 stores the state of the logical page. As described above, the state of the logical page includes three states of P, Q, and X. Last write time 1266 stores the last time a write request to the logical page was received from the computer 5.

Number of deduplicated blocks 1267 is the information which is effective when the logical page is the deduplication logical page. Of the deduplication blocks within the logical page (deduplication logical page), the number of deduplication blocks, to which data blocks having been already allocated to other deduplication blocks are further allocated by the deduplication process, is recorded in the number of deduplicated blocks 1267. It can be said that the greater the number of deduplicated blocks 1267, the greater the effect of reducing the amount of storage area consumption in the logical page. Hereinafter, the deduplication block holding the data without consuming the storage area by allocating an existing data block by the deduplication process as described above, may be referred to as the deduplication block already reduced.

Next, the mapping table 127 is described with reference to FIG. 6. The mapping table 127 is the table for managing the mapping state of the deduplication block and the data block, in which information such as the identifier of the deduplication block, and the identifier of the data block allocated to the deduplication block is stored in each row (record). The information stored in each column of the mapping table 127 will be described below.

Virtual volume 1271 and logical page 1272 respectively store the identifier of the virtual volume to which the deduplication block to be managed belongs, and the identifier of the logical page. Then, deduplication block 1273 stores the identifier of the deduplication block to be managed. Fingerprint 1274 stores the fingerprint that is calculated in the deduplication process for each deduplication block.

Physical page 1275 and data block 1276 respectively store the identifier of the physical page to which the data block allocated to the deduplication block to be managed belongs, and the identifier of the data block.

Note that any information can be used for the identifier of the deduplication block or the data block, as long as the information can uniquely identify the deduplication block or the data block. In the present embodiment, the identifier of the deduplication block uses an address within the virtual volume to which the deduplication block belongs. On the other hand, the identifier of the data block uses a relative address within the physical page to which the data block belongs (an address in which the identifier of the first data block of the physical page is 0). However, in FIG. 6, in order to illustrate the mapping relationship between the deduplication blocks and the data blocks shown in FIG. 4, the alphabets added to the deduplication logical blocks shown in FIG. 4 are used as the identifiers of the deduplication blocks, and the alphabets added to the data blocks are used as the identifiers of the data blocks.

Reduced flag 1277 is information that indicates whether or not the deduplication block to be managed is the deduplication block already reduced. When the deduplication block to be manages is the deduplication block already reduced, TRUE is stored in the reduced flag 1277, and if not, FALSE is stored.

The information on the physical page is stored and managed in the pool management table 128. The content of the pool management table 128 will be described with reference to FIG. 7.

Each record of the pool management table 128 stores information such as the state of each physical page. A physical page 1281 stores the identifier of the physical page to be managed, and a logical page 1283 stores the identifier of the logical page to which the physical page is allocated. When the physical page is not allocated to the logical page (normal logical page), or when the area within the physical page is not allocated to the deduplication block, NULL is stored in the logical page 1283.

Use state 1282 stores the use state of each physical page. The state of the physical page can include the state of being allocated to the normal logical page, the state of being used for allocation to the deduplication block, and the unused state. When the physical page is allocated to the normal logical page, "logical page" is stored in the use state 1282. When the area within the physical page is allocated to the deduplication block, "data block" is stored in the use state 1282. When the physical page is not allocated to the logical page and the area within the physical page is not allocated to the deduplication block, the state of the physical page is referred to as "unused state". In this case, "unused" is stored in the use state 1282.

For example, when allocating the physical page to a certain logical page, of the records of the pool management table 128, the storage system 1 identifies one with "unused" for the use state 1282 to determine that the physical page managed in the identified record is allocated to the logical page. Further, the storage system 1 stores the identifier (physical page 1281) of the physical page determined to be allocated, into the logical page management table 126.

Note that the physical page is the area on one or a plurality of storage devices 15. Thus, the storage system 1 also holds the information for managing the mapping of the physical page, the storage device 15 in which the physical page is present, and the address on the storage device, in addition to the pool management table 128. For example, when receiving an access request from the computer 5, the storage system 1 identifies the logical page corresponding to the area specified by the access request, and then identifies the physical page allocated to the logical page. Then, the storage system 1 further identifies the address on the storage device 15 to be accessed by referring to the mapping information. However, the mapping information and the method for identifying the address of the access destination storage device 15 by using the mapping information are known in the storage device using the Thin Provisioning technique, and its detailed description is omitted in the present embodiment.

The next describes the search table 129. The search table 129 is used in the deduplication process. The deduplication process performs a process of determining whether or not the same data as the deduplication target data is already present in the storage pool 17. In order to speed up the determination process, the storage system 1 calculates a fingerprint for each deduplication block, and stores the calculated fingerprint into the search table 129.

FIG. 8 shows an example of the search table 129. Of the columns of the search table 129, a fingerprint 1291 stores the fingerprint. Then, a deduplication block 1292 stores the positional information of the deduplication block with the fingerprint stored in the fingerprint 1291. As the positional information, the value which is a combination of the identifier of the virtual volume to which the deduplication block belongs and the identifier (address within the virtual volume) of the deduplication block is stored. The records of the search table 129 are stored by sorting them in ascending order according to the values of the fingerprint 1291.

The deduplication block 1292 of a certain record may store a plurality of pieces of positional information (in the case in which deduplication data is present). Further, there may be a case in which a plurality of records with the same value of the fingerprint 1291 is present. This is because FPs may be the same even if the storage system 1 calculates FP for a plurality of data with different contents.

When performing the deduplication determination on a certain data, the storage system 1 calculates FP of the data, and determines whether there is a record in which the same pattern as the calculated FP is stored in the column "fingerprint 1291" of the search table 129. When such a record is present, the storage system 1 further identifies (the positional information of) the deduplication block by referring to the column "deduplication block 1292" of the record. Further, the storage system 1 identifies the data block allocated to the deduplication block by referring to the mapping table 127. Then, the storage system 1 reads the data from the particular data block, and compares the read data with the determination target data byte by byte to determine whether the two match.

Figures 9, 10:
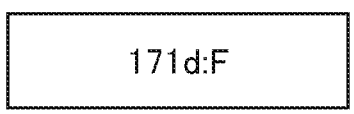
FIG. 9 is a configuration example of a dereference table.
FIG. 10 is a configuration example of a following pointer.

FIG. 9 shows an example of the dereference table 130. The dereference table 130 is the table for managing the mapping information between the data block and the deduplication block. Unlike the mapping table 127, the dereference table 130 is used for identifying the address of the deduplication block to which a data block to be managed is allocated, from the address of the data block.

Of the columns of the dereference table 130, a physical page 1301 and a data block 1302 respectively store the identifier of the physical page to which a data block to be managed belongs, and the identifier of the data block. The identifier of the data block uses, as described above, the relative address within the physical page to which the data block belongs. Deduplication block 1303 stores the positional information of the deduplication block to which data block to be managed is allocated. The positional information of the deduplication block is the value which is a combination of the identifier of the virtual volume to which the deduplication block belongs, and the identifier of the deduplication block.

FIG. 10 shows an example of the following pointer 131. The following pointer 131 is the information for managing the address of the data block to be allocated, when it is necessary to allocate the data block to the deduplication block. The following pointer 131 is a combination of the identifier of a physical page and the identifier of a data block. The storage system 1 allocates the data block indicated by the following pointer 131 to the deduplication block. After completing the allocation, the storage system 1 updates the content of the following pointer 131 to the address next to the address currently stored in the following pointer 131. When the data block at the end of the physical page is allocated to the deduplication block, the storage system 1 newly assigns an unused physical page for data block storage. Then, the storage system 1 updates the following pointer 131 with the information including the identifier of the physical page and the identifier of the data block at the top of the physical page.

(4) Flow of Processing

The next describes the flow of various types of processing performed by the storage system 1. The system memory 12 of the storage system 1 stores at least five types of programs: an I/O processing unit 121, a deduplication processing unit 123, a deduplication cancellation unit 124, a logical page change unit 125, and a physical page release processing unit 132. Note that the programs stored in the system memory 12 are also referred to as the "storage control programs". The processes performed by such programs will be described below. Note that in the drawings relating to the present embodiment, the character string "SP" placed in the front of each reference number represents "step".

First, the main process performed by the I/O processing unit 121 is described. The I/O processing unit 121 is the program for providing virtual volume to an initiator device, such as the computer 5, to perform processing of an I/O request (read request or write request) received from the initiator device.

Figure 16:
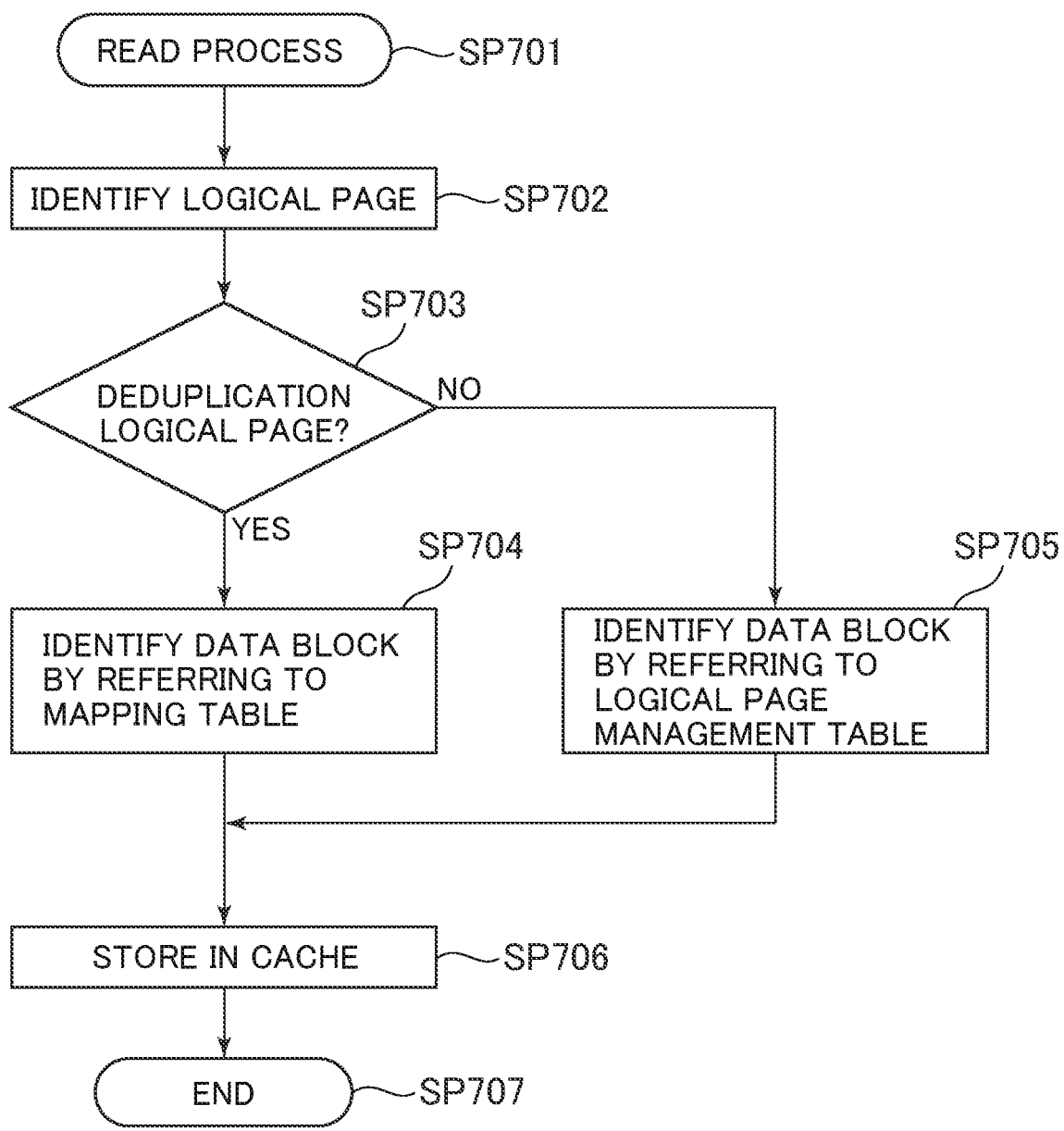
FIG. 16 is a flow chart of the read process.

The flow of the read process is described with reference to FIG. 16. The storage system 1 receives a read request to the virtual volume from the computer 5. Then, the storage system 1 returns the data specified by the read request to the computer 5. This process is referred to as the read process.

Step 702: When the storage system 1 receives a read request from the computer 5, the I/O processing unit 121 calculates a logical page number from the read destination address (LBA) included in the read request, and identifies the logical page included in the read destination address. At the same time, the I/O processing unit 121 also calculates an address within the logical page corresponding to the read destination address. In the following description, the logical page identified herein is referred to as the "access target logical page".

Step 703: Next, the I/O processing unit 121 refers to the logical page management table 126 to determine whether or not the access target logical page is the deduplication logical page. In this determination, of the records of the logical page management table 12, the I/O processing unit 121 determines whether or not the state 1265 of the record corresponding to the access target logical page is "Q". When the state 1265 is "Q" (SP703: Y), step 704 is performed next. Otherwise, the I/O processing unit 121 performs step 705 next.

Step 704: The I/O processing unit 121 refers to the mapping table 127 to identify the positional information (a combination of the physical page 1275 and the data block 1276) of the data block allocated to the area specified by the read destination address. Then, the I/O processing unit 121 obtains the address of the storage device 15 in which the read target data is stored, by using this information.

Step 705: The I/O processing unit 121 refers to the logical page management table 126 to identify (the physical page number of) the physical page allocated to the access target logical page. Further, the I/O processing unit 121 obtains the address of the storage device 15 in which the read target data is stored, based on the identified physical number as well as the address within the logical page that is calculated in step 702.

Step 706: The I/O processing unit 121 reads the data from the address of the storage device 15 obtained in step 704 or step 705, and stores the read data in the cache memory 14. Further, the I/O processing unit 121 returns the data stored in the cache memory 14 to the computer 5 and ends the process.

Figure 15:
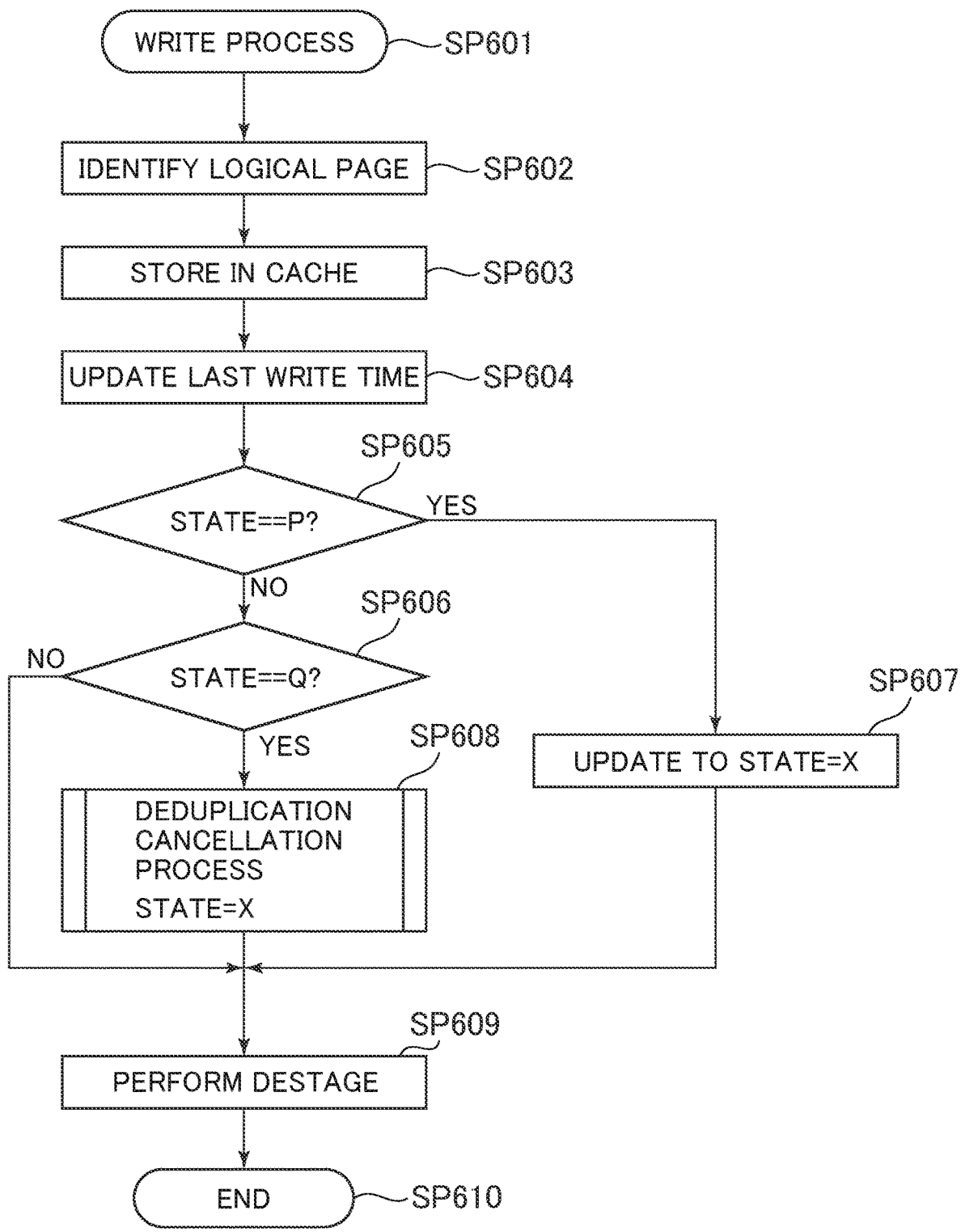
FIG. 15 is a flow chart of the write process.

Next, referring to FIG. 15, a description is given of the flow of processing (write process) when the storage system 1 receives a write request and write data to the virtual volume from the computer 5. This process is also performed by the I/O processing unit 121. Note that the information (LBA and data length) of the write destination position of the write data is included in the write request that the computer 5 issues.

Step 602: The I/O processing unit 121 calculates the identifier (logical page number) of the logical page, which is the write destination of the write data, as well as the address within the logical page, from the information of the write destination position included in the write request. Further, the I/O processing unit 121 refers to the logical page management table 126. When the sate 1265 of the logical page which is the write destination of the write data is P and the physical page 1264 is NULL, the I/O processing unit 121 performs a process of allocating the physical page to the logical page. More specifically, the I/O processing unit 121 selects a record with "unused" for the use state 1282 by referring to the pool management table 128. The I/O processing unit 121 stores the identifier of the logical page, which is the write destination of the write data, into the logical page 1283 of the record, and changes the value of the use state 1282 to "logical page". Further, the I/O processing unit 121 stores the value of the physical page 1218 that corresponds to the record selected here into the physical page 1264 of the record of the logical page, which is the write destination logical page of the write data, of the records of the logical page management table 126.

Step 603: The I/O processing unit 121 stores the write data in the cache memory 14. At this time, the I/O processing unit 121 adds the identifier of the write destination logical page as well as the address within the logical page into the write data, and stores in the cache memory 14.

Step 604: Of the records of the logical page management table 126, the I/O processing unit 121 stores the current time (the time at the execution of step 604) into the last write time 1266 of the record corresponding to the write destination logical page.

Step 605: The I/O processing unit 121 refers to the state 1265 of the record of the logical page management table 126 to determine whether or not the state of the write destination logical page is "P". When the state of the write destination logical page is "P" (SP605: Y), the I/O processing unit 121 changes the value of the state 1265 of the write destination logical page to "X" (step 607), and next performs step 609.

Step 606: The I/O processing unit 121 refers to the state 1265 of the record of the logical page management table 126 to determine whether the write destination logical page is the deduplication logical page. When the state 1265 is "Q", this means that the write destination logical page is the deduplication logical page. When the state 1265 is "Q" (SP606: Y), the I/O processing unit 121 next performs step 608. When the value of the state 1265 is not "Q" (SP606: N), step 608 is skipped.

Step 608: The I/O processing unit 121 calls the deduplication cancellation unit 124 to perform the deduplication cancellation process on the write destination logical page. The deduplication cancellation process is performed by the deduplication cancellation unit 124. The process of the deduplication cancellation unit 124 will be described later. By performing the deduplication cancellation process, the write destination logical page is changed to the normal logical page (the state 1265 is changed to X).

Step 609: The I/O processing unit 121 stores the data stored in the cache memory 14 in step 603 into the storage device 15. The process of storing the data, which is temporarily stored in the cache memory 14, into the storage device 15 is referred to as "destage process". Similar to step 705 of FIG. 16, the I/O processing unit 121 refers to the logical page management table 126 to identify the physical page allocated to the write destination logical page, and further identify the address of the storage device 15 in which the identified physical page is present. Then, the I/O processing unit 121 writes the data stored in the cache memory 14 into the address of the identified storage device 15. After the destage process, the I/O processing unit 121 notifies the computer 5 of the completion of the write process, and ends the write process.

Note that in the example described above, the storage system 1 performs a write-through process. In other words, after the destage process (step 609), the completion of the write process is notified to the computer 5. However, as another embodiment, the cache memory 14 can also be used as a write-back cache. In this case, when the data received from the computer 5 is stored in the cache memory 14 (step 603), the I/O processing unit 121 can notify the computer 5 of the completion of the write process. Further, in this case, the processing following step 605 may not necessarily be performed immediately after the data is stored in the cache memory 14, and may be performed at an arbitrary timing.

Figure 14:
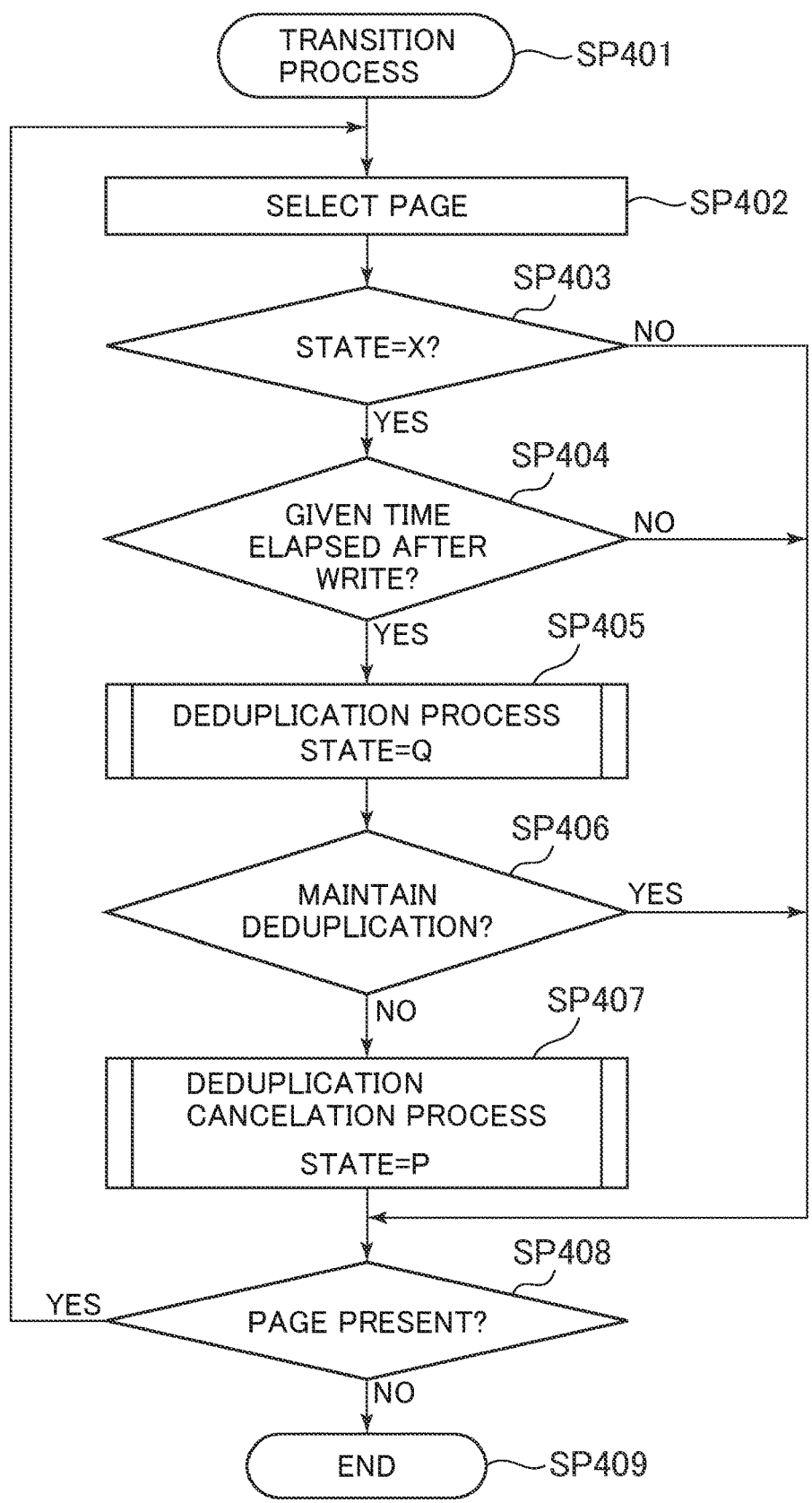
FIG. 14 is a flow chart of the transition process.

Next, the flow of processing that the logical page change unit 125 performs is described with reference to FIG. 14. In the present embodiment, this process is referred to as "transition process". The transition process is a process of changing the state of a normal logical page that satisfies a predetermined condition, of the logical pages of the virtual volume. The transition process is performed on each virtual volume at regular intervals. The following describes the flow of the processing when the storage system 1 performs the transition process on a specific virtual volume.

Step 402: Of the logical pages of the virtual volume, the logical page change unit 125 selects one logical page on which the process following step 403 has not been performed. The method of selecting the logical page here is arbitrary. For example, the logical page change unit 125 can perform the process following step 403 in descending order from the first logical page of the virtual volume.

Step 403: The logical page change unit 125 refers to the logical page management table 126 to determine whether or not the state 1265 of the selected logical page is "X". When the state 1265 is "X" (step 403: Y), step 404 is performed next. When the state 1265 is not "X" (step 403: N), steps 404 to 407 are skipped.

Step 404: The logical page change unit 125 refers to the last write time 1266 of the selected logical page to calculate the difference between the current time and the last write time 1266, and determines whether the difference is equal to or more than a predetermined value. When the difference is equal to or more than a predetermined value (step 404: Y), this means that a write from the computer 5 does not occur in the selected logical page for a predetermined time or more. In this case, the logical page change unit 125 next performs step 405. When the difference between the current time and the last write time 1266 is less than the predetermined value, step 405 to step 407 are skipped.

Step 405: The logical page change unit 125 calls the deduplication processing unit 123 to perform the deduplication process on the selected logical page. This process is a process of changing the state of the normal logical page to the state "Q" (namely, the process of changing to the deduplication logical page). The details are described below.

Step 406: The logical page change unit 125 determines whether or not the selected logical page should be maintained as deduplication logical page. More specifically, of the records within the logical page management table 126, the logical page change unit 125 first counts the number of records in which the deduplication 1263 is "valid", to identify the number of deduplication logical pages within the storage system 1. Then, the logical page change unit 125 determines whether or not the identified number is equal to or more than a threshold. When the number is less than the threshold, the logical page change unit 125 determines that the selected logical page should be maintained as deduplication logical page.

When the number of deduplication logical pages within the storage system 1 is small (less than the threshold), the number of deduplication blocks which are targets for duplication determination is small. When the number of target deduplication blocks for duplication determination is small, the effect of reducing the amount of storage area consumption by the deduplication process does not appear. For this reason, the storage system 1 maintains the selected logical page as deduplication logical page until the number of existing deduplication logical pages reaches or exceeds the threshold.

Note that the method of identifying the number of deduplication logical pages is not limited to the method described above. As another embodiment, the storage system 1 can provide an area for recording the number of deduplication logical pages in advance in the system memory 12 to identify the number of deduplication logical pages by increasing or decreasing the number of deduplication logical pages recorded in the system memory 12 each time the process of changing the normal logical page to the deduplication page is performed, or vice versa.

When the number of deduplication logical pages is equal to or more than the threshold, the logical page change unit 125 further calculates the deduplication ratio by referring to the number of deduplicated blocks 1267 of the selected logical page, to determine whether the calculated value is equal to or more than the threshold. The deduplication ratio can be obtained by "the number of deduplicated blocks 1267÷the number of deduplication blocks within the logical page".

When the deduplication ratio is equal to or more than the threshold, this means that the amount of storage area consumption is reduced by the deduplication process, so that the logical page change unit 125 determines that the selected logical page should be maintained as deduplication logical page.

On the other hand, when the deduplication ratio is less than the threshold, the effect of reducing the amount of storage area consumption in the selected logical page is not significant, so that the necessity to maintain as deduplication logical page is low. Thus, the logical page change unit 125 determines that the selected logical page is not maintained as deduplication logical page. When it is determined that there is no need to maintain the selected logical page as deduplication logical page (step 406: N), step 407 is performed next. When it is determined that the selected logical page needs to be maintained as deduplication logical page (step 406: Y), step 407 is skipped.

Step 407: The logical page change unit 125 calls the deduplication cancellation unit 124 to perform the deduplication cancellation process on the selected logical page. This process is a process of changing the deduplication logical page to a logical page with state P. The details of this process are described below.

Step 408: Of the logical pages of the virtual volume, the logical page change unit 125 determines whether there is a logical page on which the process of step 403 to step 407 has not been performed yet. When there is a logical page on which the process of step 403 to step 407 has not been performed yet (step 408: Y), the logical page change unit 125 performs step 402 again. When the process of step 403 to step 407 have been performed on all the logical pages within the virtual volume (step 408: N), the logical page change unit 125 ends the process.

Note that in the example described above, in step 406, the logical page change unit 125 calculates the deduplication ratio to determine whether or not the selected logical page is maintained as deduplication logical page based on the deduplication ratio. However, the logical page change unit 125 can also determine whether or not the selected logical page is maintained as deduplication logical page, by determining whether or not the number of deduplicated blocks 1276 is equal to or more than a predetermined threshold, instead of calculating the deduplication ratio. This is because it is apparent that when the number of deduplicated blocks 1267 is large, the deduplication ratio is actually also large, and when the number of deduplicated blocks 1267 is small, the deduplication ratio is actually also small. Further, in addition to the deduplication ratio and the number of deduplicated blocks 1267, other index values that can estimate the effect of reducing the amount of storage area consumption in the logical page can also be used for the determination of step 406.

Figure 11:
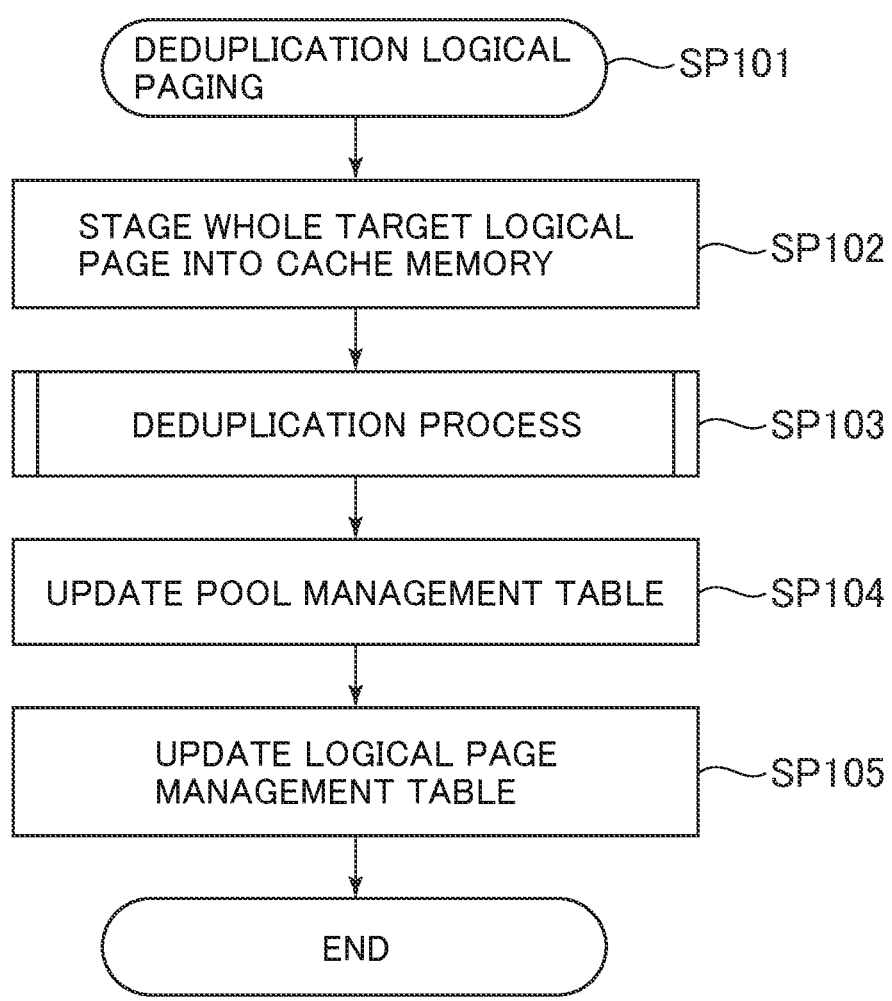
FIG. 11 is a flow chart of a deduplication processing unit.
Figure 12:
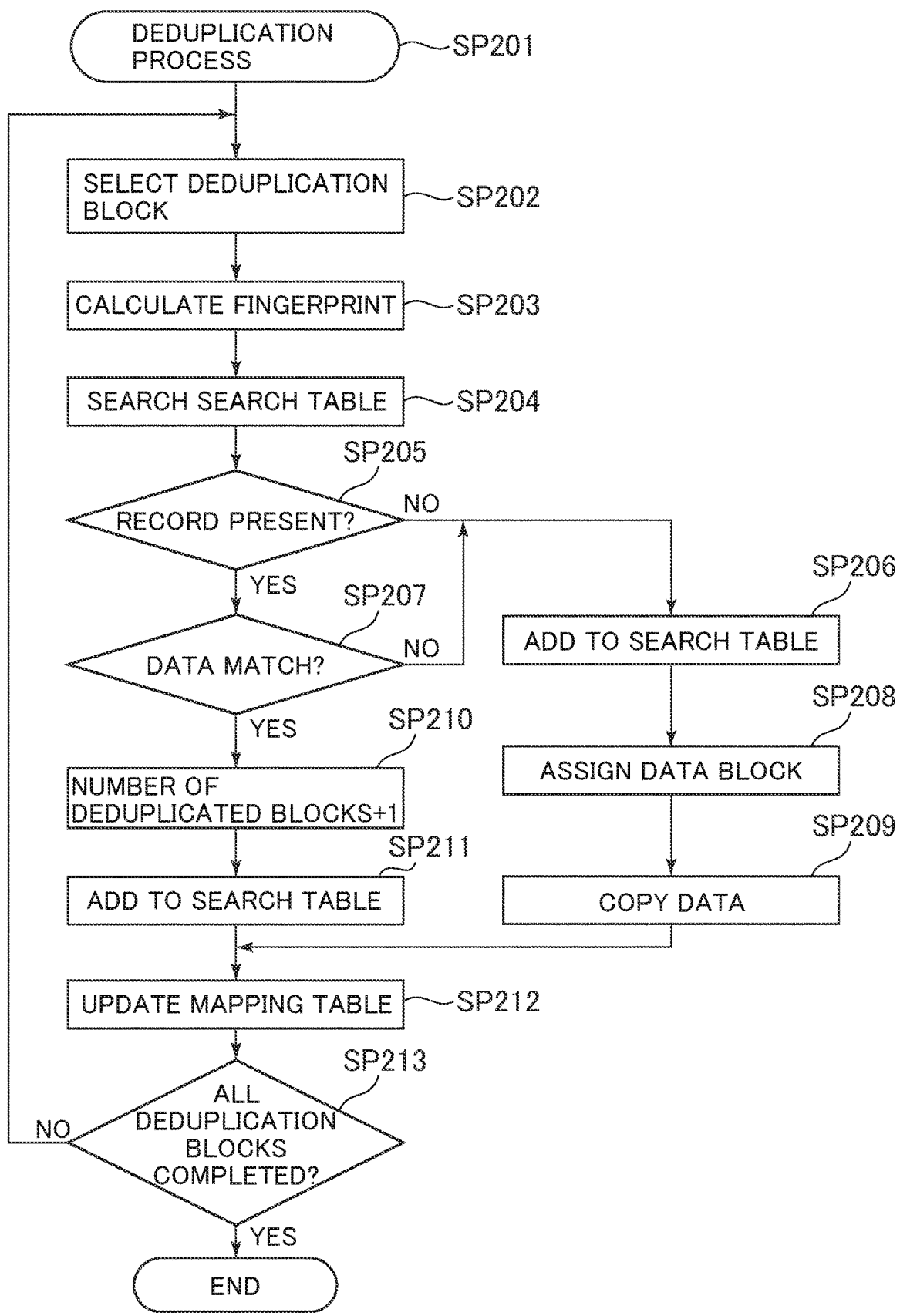
FIG. 12 is a diagram showing the flow of the deduplication process.

Next, the flow of the deduplication process performed in step 405 is described with reference to FIG. 11 and FIG. 12. FIG. 11 and FIG. 12 are flow charts of the processing that the deduplication processing unit 123 performs. The deduplication processing unit 123 is called from the logical page change unit 125 (step 405 in FIG. 14) to start the processing. At this time, the logical page change unit 125 notifies the deduplication processing unit 123 of the information of the logical page to be processed (more specifically, the identifier of the virtual volume to which the logical page belongs as well as the identifier of the logical page). The deduplication processing unit 123 performs a process of changing the state of the notified logical page. In the following description, the logical page notified by the logical page change unit 125 is referred to as the "specified logical page".

Step 102: The deduplication processing unit 123 identifies the physical page allocated to the specified logical page by referring to the logical page management table 126. Then, the deduplication processing unit 123 reads the data stored in the physical page and stores in the cache memory 14.

Step 103: The deduplication processing unit 123 performs the deduplication process. Here, the deduplication processing unit 123 performs the deduplication process for each deduplication block within the specified logical page. A deduplication is given below with reference to FIG. 12.

First, in step 201, the deduplication processing unit 123 prepares a variable k in such a way that the variable k indicates the first deduplication block of the logical page (more specifically, the deduplication processing unit 123 assigns the identifier of the first deduplication block of the specified logical page to k). In the following description, the deduplication block indicated by the variable k is referred to as the "selected deduplication block".

Next, of the data stored in the cache memory 14 in step 102, the deduplication processing unit 123 selects (identifies) the data of the selected deduplication block (step 202). Next, the deduplication processing unit 123 reads the identified data, and calculates the fingerprint of the data (step 203).

Next, in step 204, the deduplication processing unit 123 searches for a record in which the same value as the fingerprint calculated in step 203 is stored in the fingerprint 1291, by referring to the search table 129. When there is a record (step 205: Y), step 207 is performed. When there is no appropriate record (step 205: N), step 206 is performed.

In step 206, the deduplication processing unit 123 generates a record configured with the fingerprint calculated in step 203 as well as the positional information of the selected deduplication block. Then, the deduplication processing unit 123 adds the generated record to the search table 129. Then, step 208 is performed.

In step 207, the deduplication processing unit 123 reads the data from the deduplication block identified by the column "deduplication block 1292" of the record that is obtained as a result of the search in step 204. More specifically, the deduplication processing unit 123 refers to the physical page 1275 and the data block 1276 in the mapping table 127 to identify the data block that is allocated to the identified deduplication block, and reads the data from the identified data block. Then, the deduplication processing unit 123 compares the read data with the data selected in step 202 byte by byte to determine whether the two match. When the two match (step 207: Y), step 210 is performed next.

If identifiers of a plurality of deduplication blocks are stored in the deduplication block 1292 of the record of the search table 129 that is obtained by the search in step 204, the deduplication processing unit 123 also compares data of the deduplication blocks in the same manner. Further, when a plurality of records of the search table 129 is obtained as a result of the search, the deduplication processing unit 123 compares data on each record in the same manner. If any deduplication block does not match the data selected in step 202 as a result of the comparison (step 207: N), step 206 is performed next.

In step 208, the deduplication processing unit 123 assigns a data block to which the data selected in step 202 is written. More specifically, the deduplication processing unit 123 selects the address of the data block recorded in the following pointer 131, as the data storage destination. Then, the deduplication processing unit 123 adds the size of the data block to the following pointer 131. If the value of the following pointer 131 is the last address of the physical page, the deduplication processing unit 123 selects an unused physical page by referring to the pool management table 128, changes this physical page to the physical page for data block storage, and stores the head address of the selected physical page into the following pointer 131.

Next, in step 209, the deduplication processing unit 123 writes the data selected in step 202 into the physical page (storage device 15) having the assigned data block. Further, the deduplication processing unit 123 records, the dereference table 130, the information of the deduplication block to which the data block assigned in step 208 is allocated. More specifically, the deduplication processing unit 123 stores the identifier of the deduplication block to be processed into the deduplication block 1303 of the record of the dereference table 130 that corresponds to the data block.

Step 210 is a process that is performed when the duplicate data of the data selected in step 202 is present in a data block that has already been allocated to another deduplication block. In step 210, the deduplication processing unit 123 adds 1 to the number of deduplicated blocks 1267 of the specified logical page. Note that, in this case, unlike step 208 to step 209, the data selected in step 202 is not written to the storage device 15.

In step 211, the deduplication processing unit 123 adds the identifier of the selected deduplication block into the column "deduplication block 1292" of the record of the search table 129 in which the matching data is found as a result of step 207.

In step 212, of the records of the mapping table 127, the deduplication processing unit 123 updates the record of the selected deduplication block. If the determination in step 207 is positive, namely, when there is a data block in which the duplicate data of the data selected in step 202 is stored, the deduplication processing unit 123 registers the physical page identifier of the data block as well as the data block address into the record of the mapping table 127. At this time, the deduplication processing unit 123 stores "TRUE", which is the value indicating that the deduplication block is the deduplication block already reduced, into the column "reduced flag 1277" of this record.

On the other hand, when the data block in which the duplicate data of the data selected in step 202 is not present (namely, when the determination in step 205 or step 207 is negative), the deduplication processing unit 123 registers the physical page identifier of the data block to which the data is written in step 206 as well as the data block identifier into the record of the mapping table 127. At this time, "FALSE" is stored in the column "reduced flag 1277" of the record in which the identifiers are registered.

Further, when the determination in step 207 is either positive or negative, the fingerprint value calculated in step 203 is stored in the column "fingerprint 1274" of the record.

When the variable k is equal to the end address within the logical page, namely, when the process up to step 212 is completed on all deduplication blocks (step 213: Y), this process (step 103) is completed. When there are deduplication data blocks on which the process up to step 212 has not been completed (step 213: N), the deduplication processing unit 123 updates the variable k (by adding the size of the deduplication block to the variable k) so that the variable k indicates the next deduplication block, and performs the process again from step 202. This is the content of the process performed in step 103.

Now return to the description of FIG. 11. In step 104 and step 105, the deduplication processing unit 123 cancels the allocation of the physical page that is allocated to the specified logical page.

Step 104: Of the records of the pool management table 128, the deduplication processing unit 123 changes the use state 1282 of the record of the allocated physical page to "unused", and changes the logical page 1283 to NULL.

Step 105: of the records of the logical page management table 126, the deduplication processing unit 123 changes the content of the record of the specified logical page. More specifically, the physical page 1264 and the last write time 1266 in this record are changed to NULL. Then, "invalid" is store in the deduplication 1263 and "Q" is stored in the state 1265. When the process up to step 105 is completed, the deduplication processing unit 123 ends the process.

Figure 13:
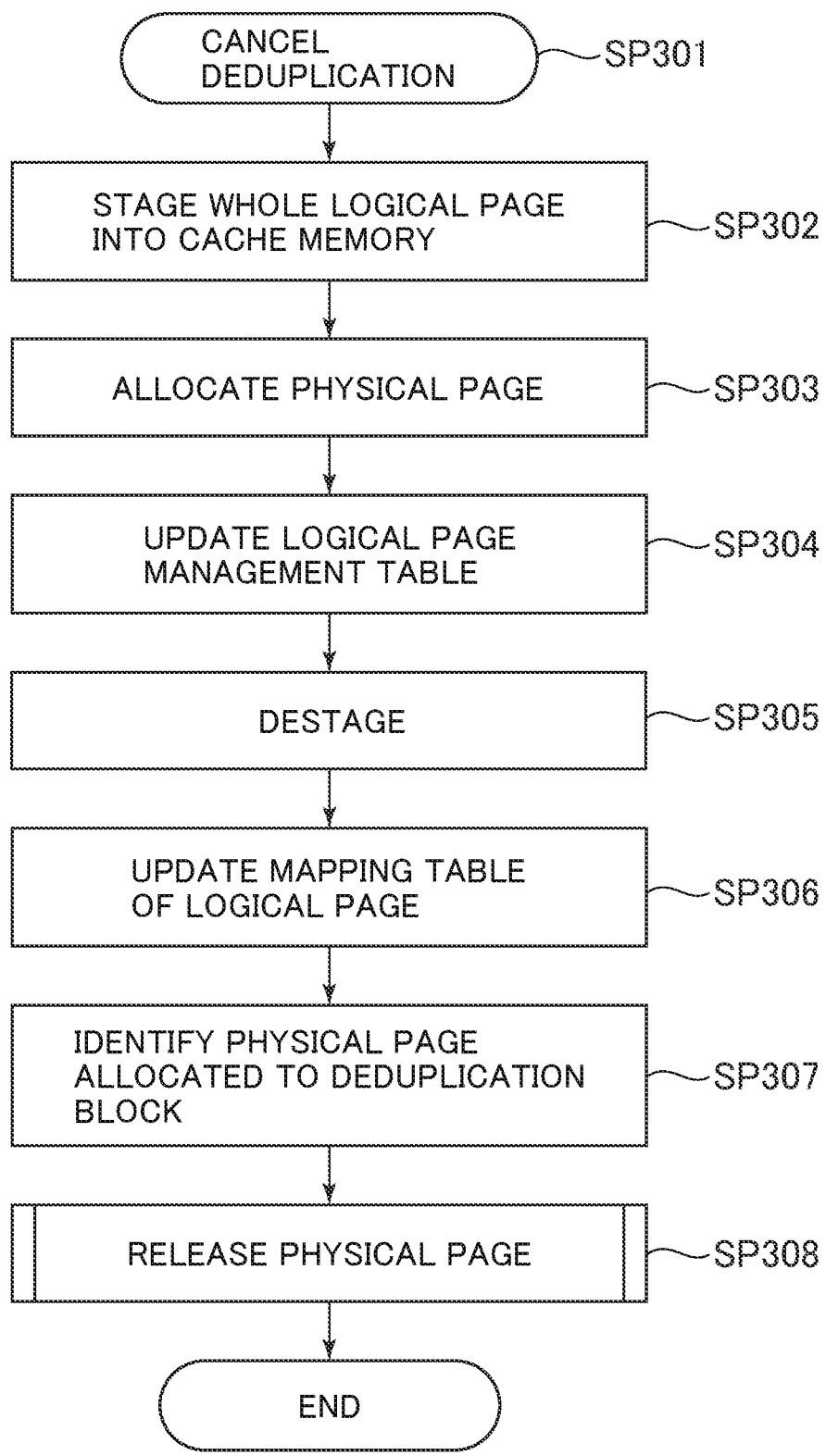
FIG. 13 is a flow chart of a deduplication cancellation unit.

Next, the flow of the deduplication cancellation process performed in step 407 or step 608 is described with reference to FIG. 13. FIG. 13 is a flow chart of the process performed by the deduplication cancellation unit 124. The deduplication cancellation unit 124 is called by the logical page change unit 125 or the I/O processing unit 121, and starts the process.

At this time, the logical page change unit 125 or the I/O processing unit 121 notifies the deduplication cancellation unit 124 of the information of the logical page to be processed (more specifically, the identifier of the virtual volume to which the logical page belongs, and the logical page identifier). The deduplication cancellation unit 124 performs a process of changing the state of the notified logical page. In the following description, the logical page identified by the information that is notified to the deduplication cancellation unit 124 is referred to as the "specified logical page".

Step 302: The deduplication cancellation unit 124 identifies the data block allocated to each deduplication block of the specified logical page by referring to the mapping table 127. Then, the deduplication cancellation unit 124 reads the data stored in all specified data blocks, and stores in the cache memory 14.

Step 303: The deduplication cancellation unit 124 allocates an unused physical page to the specified logical page. The process of allocating a physical page is the same as that described in step 602.

Step 304: The deduplication cancellation unit 124 updates the content of the record of the logical page management table 126 that corresponds to the specified logical page. More specifically, the content update is performed as follows. First, the deduplication 1263 of the record is changed to "invalid", and the number of deduplicated blocks 1267 is changed to 0. Further, at the time of execution of step 303, the identifier of the allocated physical page is stored in the physical page 1263, so that the physical page 1263 is not updated here.

Step 305: The deduplication cancellation unit 124 destages the data that is stored in the cache memory 14 in step 302 into the physical page that is allocated in step 303.

Step 306: Of the records of the mapping table 127, the deduplication cancellation unit 124 updates the content of the record that manages the information of each deduplication block included in the specified logical page. Here, the physical page 1275 and the data block 1276 in each record are changed to NULL. Note that, at this time, the fingerprint 1274 and the reduced flag 1277 are not updated and maintain their original values.

Step 307: The deduplication cancellation unit 124 identifies the physical page having data blocks allocated to each of the deduplication blocks of the specified logical page. More specifically, of the records of the mapping table 127, the deduplication cancellation unit 124 searches for a record in which the identifier of the specified logical page and the information of the column "logical page 1272" match with FALSE for the reduced flag 1277. Then, the deduplication cancellation unit 124 extracts the information of the physical page 1275 from each record obtained as a result of the search without duplication. In step 307, one or more physical pages may be identified. Further, only records with FALSE for the reduced flag 1277 are searched here, so that the deduplication blocks already reduced are excluded from the search result.

Step 308: The deduplication cancellation unit 124 changes the physical page identified in step 307 to an unallocated state. In the present embodiment, the process of changing the physical page used for data block storage to au unallocated state is referred to as the "physical page release process". Further, putting the physical page into an unallocated state may be expressed as "releasing the physical page".

Before the execution of step 308, there may be a case in which some data blocks that are still shared by a plurality of deduplication blocks are present in the physical page to be released. Hereinafter, such data blocks are referred to as the shared data blocks. Further the data of the shared data block is referred to as the shared data.

Before changing the physical page to an unallocated state, the physical page release process moves (copies) the shared block of the physical page to a data block of another physical page. Then, the physical page release process changes the deduplication block to which the shared data block is allocated, to the state in which the duplication destination data block is allocated. Then, the physical page release process changes the target physical page to an unallocated state.

The physical page release process is performed by the physical page release processing unit 132. In step 308, of the identifiers of the physical pages identified in step 307, the deduplication cancellation unit 124 notifies the physical page release processing unit 132 of the identifiers excluding that of the physical page recorded in the following pointer 131. The physical page release processing unit 132 performs the physical page release process on the notified physical pages.

Figure 17:
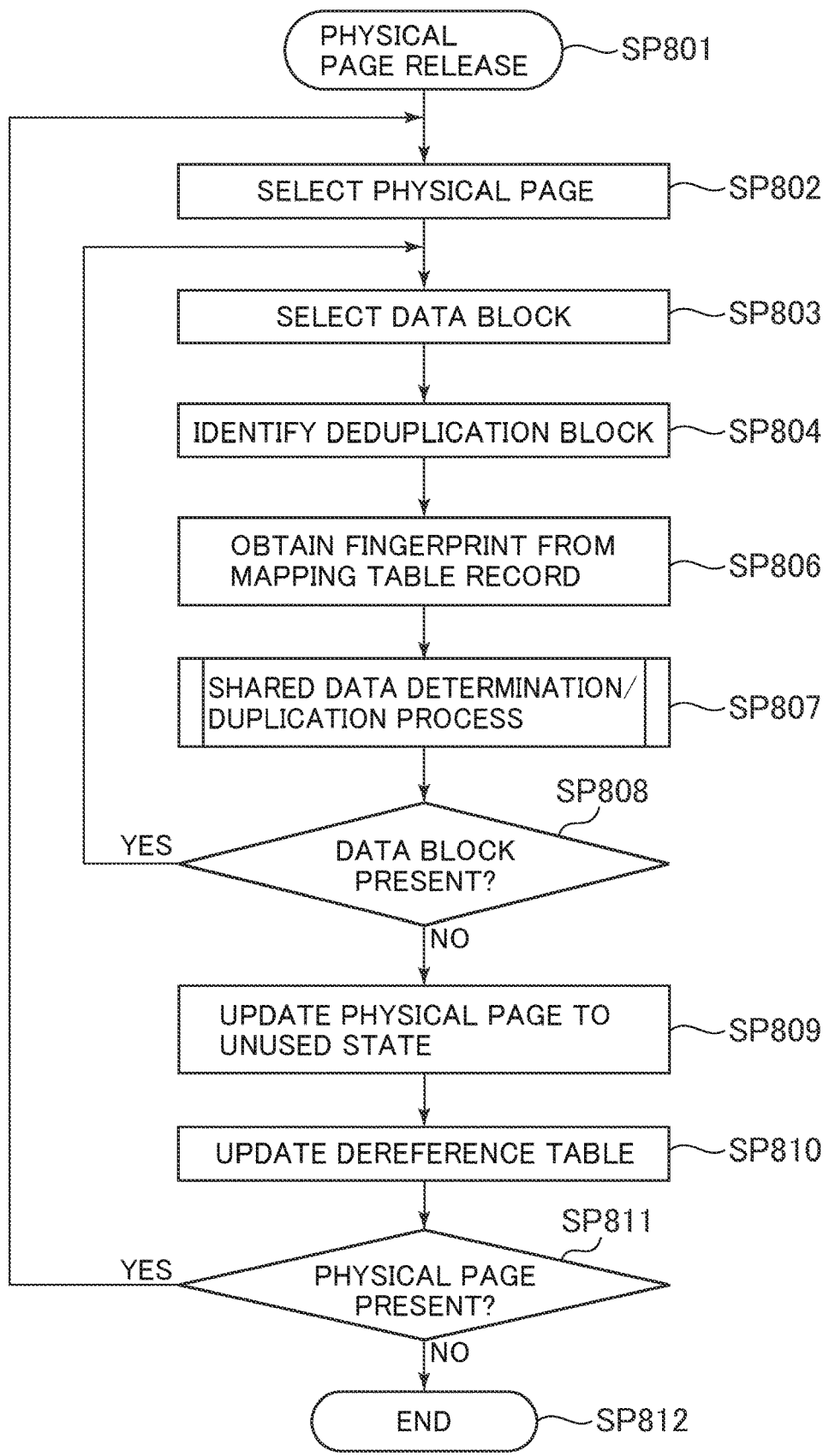
FIG. 17 is a flow chart of the physical page release process.

The flow of processing in the physical page release processing unit 132 will be described with reference to FIG. 17. FIG. 17 is a flow chart of the processing that the physical page release processing unit 132 performs.

Step 802: The physical page release processing unit 132 selects one of the identifiers of the notified physical pages. The physical page identified by the selected physical page identifier is referred to as the processing target physical page.

Step 803: The physical release processing unit 132 selects one of the data blocks included in the processing target physical page. In the following description, the data block selected in step 803 is referred to as the processing target data block.

Step 804: The physical page release processing unit 132 refers to the record of the dereference table 130 that corresponds to the processing target data block, and identifies the deduplication block from the identifier of the deduplication block stored in the deduplication block 1303. The deduplication identified here is the deduplication block to which the processing target data block is allocated in step 209 (deduplication process).

Step 806: The physical page release processing unit 132 obtains the value of the fingerprint 1274 by referring to the record of the mapping table 127 that corresponds to the deduplication block identified in step 804.

Step 807: When the processing target data block is a shared data block, the physical page release processing unit 132 moves (copies) the data to a data block of another physical page, to change the state in such away that the deduplication block that shares the processing target data block will share a duplication destination data block. The details of step 807 will be described below.

Step 808: The physical page release processing unit 132 determines whether steps 804 to 807 have been performed on all the data blocks included in the processing target physical page. When there is a data block on which steps 804 to 807 have not been performed (step 808: Y), the physical page release processing unit 132 selects the data block next to the processing target data block (step 803), and performs steps 804 to 807. When step 804 to 807 have been performed on all the data blocks included in the processing target physical page (step 808: N), step 809 is performed.

Step 809: The physical page release processing unit 132 changes the use state 1282 of the record of the pool management table 128 that corresponds to the processing target physical page into "unused".

Step 810: With respect to all the data blocks included in the processing target physical page, the physical page release processing unit 132 stores NULL in the deduplication block 1303 of the corresponding record of the dereference table 130 for each data block.

Step 811: The physical page release processing unit 132 determines whether steps 803 to 811 have been performed on all physical pages notified by the deduplication cancellation unit 124. When there are physical pages on which step 803 to 811 have not been performed (step 811: Y), the physical page release processing unit 132 selects one of such physical pages (step 802), and performs the steps from step 803. When steps 803 to 811 have been performed on all the notified physical pages (step 811: N), the physical page release process is completed.

Figure 18:
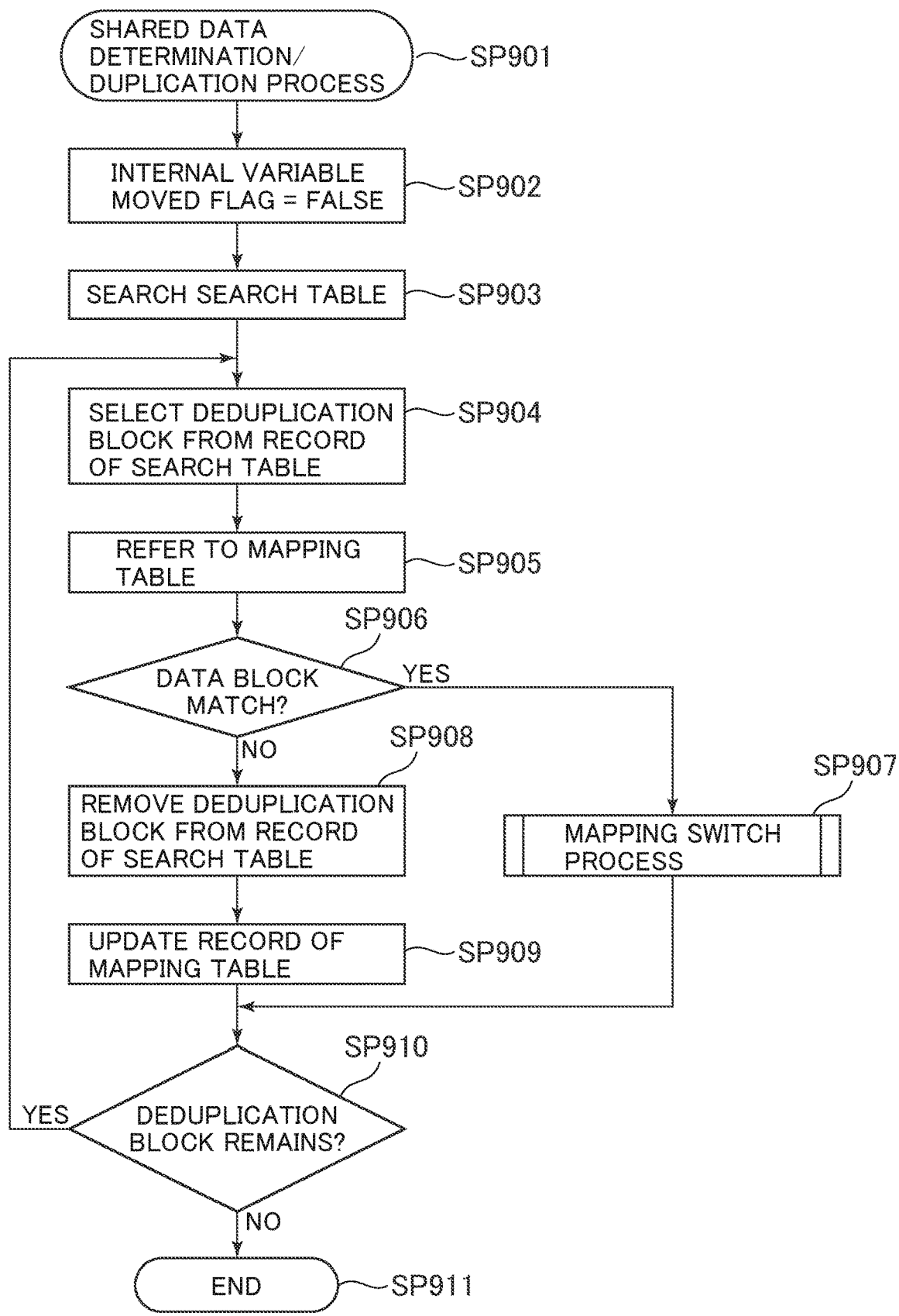
FIG. 18 is a flow chart of the shared data determination/ duplication process.

The flow of the shared data determination/duplication process of step 807 will be described with reference to FIG. 18. FIG. 18 is a flow chart of the shared data determination/duplication process.

Step 902: The physical page release processing unit 132 prepares an internal variable "moved", and sets FALSE as the default.

Step 903: The physical page release processing unit 132 searches the search table 129 to identify the record in which the fingerprint obtained in step 806 is included in the column of "fingerprint 1291" and the identifier of the deduplication block obtained in step 804 is included in the column of "deduplication block 1292".

Step 904: The physical page release processing unit 132 selects the identifier of the deduplication block stored in the deduplication block 1292 of the record identified in the search table 129.

Step 905: The physical page release processing unit 132 refers to the record of the mapping table 127, which corresponds to the identifier of the deduplication block selected in step 904, and obtains various types of information stored in the record.

Step 906: The physical page release processing unit 132 determines whether or not the processing target data block is allocated to the deduplication block selected in step 904. When it is determined that the processing target data block is allocated to the selected deduplication block, the processing target data block should be the shared data block. The specific method of determination is as follows. That is, when the data block identified by the physical page 1275 and data block 1276 of the record obtained in step 905 matches the processing target data block, it is determined that the processing target data block is allocated. When the data blocks match (step 906: Y), the physical page release processing unit 132 performs a process of moving (copying) the data to a data block of another physical page and allocating the duplication destination data block to the deduplication block. This processing is performed by the mapping switch process in step 907. The flow of the mapping switch process will be described later. When the data blocks do not match (step 906: N), step 908 is performed next.

Note that when the deduplication block selected in step 904 is included in the logical page to which the deduplication cancellation process has been applied, the result of the determination of step 906 is "not matching". This is because NULL is stored in the physical page 1275 and the data block 1276 in the record of the mapping table 127 that corresponds to the deduplication block.

Step 908: The physical page release processing unit 132 removes the identifier of the deduplication block selected in step 904 from the deduplication block 1292 of the record of the search table 129 that is identified in step 903. As a result, when the identifier of the deduplication block is not registered in the deduplication block 1292, namely, when the state of the deduplication block 1292 is blank, the identified record is removed from the search table 129.

Step 909: The physical page release processing unit 132 stores NULL in the fingerprint 1274 of the record of the mapping table 127 that is referred to in step 905. Further, the physical page release processing unit 132 stores FALSE in the reduced flag 1277 of the same record.

Step 910: Of the identifiers stored in the deduplication block 1292 of the record of the search table 129 that is identified in step 903, the physical page release processing unit 132 determines whether there is an identifier on which steps 905 to 909 have not been performed. When there are deduplication block identifiers on which steps 905 to 909 have not been performed yet (step 910: Y), the physical page release processing unit 132 selects one of them (step 904), and performs the process from step 905. If not (step 910: N), the physical page release processing unit 132 ends the process.

Figure 19:
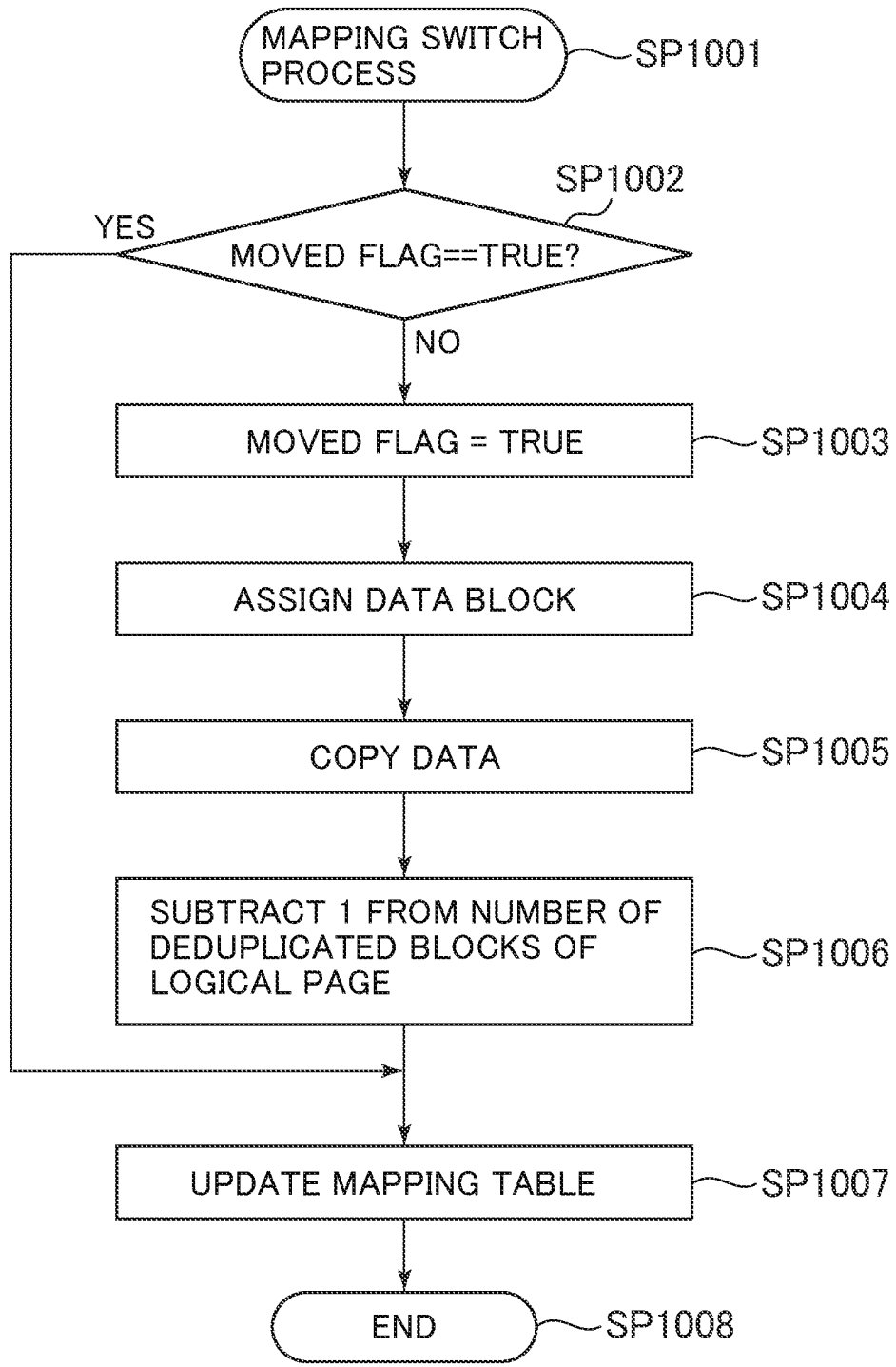
FIG. 19 is a flow chart of the mapping switch process.

The flow of the mapping switch process of step 907 will be described with reference to FIG. 19. FIG. 19 is a flow chart of the mapping switch process.

The mapping switch process is a process of moving (copying) the data of the data block selected in step 803 to a data block of another physical block.

Step 1002: When the value of the internal variable "moved flag" that is prepared in step 902 is FALSE (step 1002: N), the physical page release processing unit 132 performs step 1003. When the moved flag is TRUE (step 1002: Y), step 1003 to step 1006 are skipped.

Step 1003: The physical page release processing unit 132 sets TRUE in the moved flag.

Step 1004: The physical page release processing unit 132 assigns a data block which is the duplication destination of the data block selected in step 803. The content of the process of assigning the data block is the same as step 208 (deduplication process).

Step 1005: The physical page release processing unit 132 reads the data of the data block selected in step 803, and writes to the data block assigned in step 1003. This process is the same as step 209 (deduplication process).

Step 1006: The physical page release processing unit 132 changes the deduplication block selected in step 904 from deduplication block already reduced to normal deduplication block. Thus, in step 1006, the physical page release processing unit 132 subtracts 1 from the number of deduplicated blocks (the number of deduplicated blocks 1267 of the logical page management table 126) of the logical page including the particular deduplication block.

Step 1007: The physical page release processing unit 132 updates the record of the mapping table 127 that corresponds to the deduplication block selected in step 904. The changes are as follows. First, the physical page of the data block assigned in step 1004 and the identifier of the data block are stored respectively in the physical page 1275 and in the data block 1276. Next, when the moved flag is FALSE in step 1002, namely, when the deduplication block already reduced is changed to the normal deduplication block, the content of the reduced flag 1277 is changed to FALSE.

Although the embodiments of the present invention have been described, they are illustrative of the present invention and the present invention is not intended to be limited to only these embodiments. In other words, the present invention can also be implemented in various other embodiments.

The above has described an example in which several pieces of information that the storage system uses are managed in a table structure such as the logical page management table 126. However, it should be appreciated that the present invention is not limited to the aspect of managing information in the table structure. The storage system can also manage information by using a data structure other than table, for example, a list structure.

Further, the storage system can perform a compression process in addition to the deduplication process. For example, as a storage device included in the storage system, a storage device having a function (compression function) for compressing and storing data can be used to compress data to be stored in the storage device. At this time, in order to maintain access performance to data written in the normal logical page, it is desirable to store only data written in the deduplication logical page into the storage device having the compression function. Further, as another embodiment, the storage system can be configured to allow the CPU of the storage controller to compress data to be stored in the storage device.

Further, the above has described an example in which, at the time when data is written to a deduplication logical page, the storage system first changes the deduplication logical page to a normal logical page and then stores the data in the drive. However, it may be also possible to store the written data to the drive without changing the deduplication logical page to a normal logical page. For example, when data is written to the deduplication logical page, the storage system can assign an area of the physical page to store the data, and update the mapping relationship between the address of the deduplication logical page and the address of the physical page. In this case, it may also be possible to determine whether or not the deduplication logical page is returned to the normal logical page based on indexes such as the amount of data written to the deduplication logical page, the number of times of writing, and their amount per given period of time.

Further, the above has described an example in which, at the time when the deduplication logical page is changed to a normal logical page, the storage system changes the physical page, in which the data of the logical page before the change is stored, to an unused state. However, it may also be possible to change the physical page to an unused state at an arbitrary timing, after changing the deduplication logical page to a normal logical page. For example, the storage system can determine the timing to change the physical page to an unused state based on indexes such as the number of unused physical pages, the number of physical pages allocated to the logical page, the number of physical pages that are allocated to store the data of the deduplication logical page, the number of deduplication logical pages, and the processing load of the hardware configuring the storage system. Further, the storage system can record information such as the amount of stored data and the amount of released allocations to deduplication blocks, for each physical page. Then, based on the information for each physical page, the storage system can select the physical page to be changed to the unused state.

Further, the hardware configuration of the storage system is not limited to the configuration described above. For example, a system in which one or more storage devices are mounted on the computer described in the above embodiments can be used as a storage system. Then, the same function as the storage system described in the above embodiments can be achieved by allowing the processor of the computer to execute each of the programs described in the above embodiments.

Further, the above embodiments have described an example in which the computer 5, which is the access request source, and the storage system 1 have different hardware. However, as another embodiment, the computer 5 and the storage system 1 can be implemented as a single hardware. In other words, the storage control program executed by the storage system 1 and the application program executed by the computer 5 can be executed on the same computer. In this case, it is possible to configure in such away that the application program as the access request source issues an I/O request to the storage control program, and that the storage control program returns a response (read data when the I/O request is a read request) to the application program which is the access request source. It is preferable to forma virtual computer for executing the application program, as well as a virtual computer for executing the program for the I/O processing unit 121, the deduplication processing unit 123, and the like, by allowing a program (such as hypervisor) for forming the virtual computers to be executed on the computer.

LIST OF REFERENCE SIGNS

1: storage system, 5: computer, 6: SAN, 10: storage controller, 11: CPU, 12: system memory, 14: cache memory, 15: storage device, 121: I/O processing unit, 123: deduplication processing unit, 124: deduplication cancellation unit, 125: logical page change unit, 126: logical page management table, 127: mapping table, 128: pool management table, 129: search table, 130: dereference table, 131: following pointer, 132: physical page release processing unit

The invention claimed is:

1. A storage system comprising:
one or more storage devices configured to store write data from a host computer; and
a storage controller configured to provide one or more volumes to the host computer,
wherein, in response to receiving, from the host computer, a respective write request and respective write target data for a respective partition in a volume of the one or more volumes, the storage controller is further configured to allocate, to the respective partition, a respective storage area of the one or more storage devices that has a same size as the respective partition, and store the respective write target data in the allocated respective storage area, wherein the storage controller is further configured to hold a respective last write time which is a time when a write request is last received from the host computer, for each respective partition within the volume, wherein the storage controller, when the respective partition that does not receive another write request for a predetermined time or more from the respective last write time and when same data as the data written to the partition from the host computer has been stored in the one or more storage devices, is further configured to perform a deduplication process so as not to store the data written to the respective partition in the one or more storage devices and wherein the storage controller, in the deduplication process, is further configured to:

divide the respective partition into a plurality of deduplication blocks, allocate, for each respective deduplication block, a respective data block that has a same size as the respective deduplication block, and manage mapping between the respective deduplication block and the respective data block, and wherein the storage controller, when allocating a second data block to a second deduplication block of the deduplication blocks, in a case that the data written to the second deduplication block is identical to data stored in a first data block allocated to a first deduplication block of the deduplication blocks, is further configured to allocate the first data block to the second deduplication block.

2. The storage system according to claim 1, wherein the storage controller is further configured to manage a state for each respective partition, the respective state of the respective partition includes a first state which is a state in which the deduplication process is not performed, a second state which is a state in which the deduplication process is performed, and a third state which is a state in which the partition is returned from the second state to the state before the deduplication process is performed, and wherein the storage controller, when a deduplication ratio of the respective partition is less than a predetermined threshold as a result of the execution of the deduplication process on the respective partition having the first state, is configured to change the state of the respective partition to the third state.

3. The storage system according to claim 2, wherein the respective partition having the third state is not changed until another write request is issued from the host computer.

4. The storage system according to claim 3, wherein the storage controller, when another write request is issued from the host computer to the respective partition having the second state or the third state, is configured to change the state of the respective partition to the first state.

5. The storage system according to claim 4, wherein the storage controller is configured to calculate a feature amount of the data written to the respective deduplication block, and manage mapping between the calculated feature amount and the data block allocated to the respective deduplication block, and wherein the storage controller, after the calculation of the feature amount of the second deduplication block, when a same value as the feature amount of the second deduplication block is not stored in a search table, allocate the second data block to the second deduplication block and store the data written to the second deduplication block in the second data block.

6. A method for controlling a storage system, wherein the storage system includes one or more storage devices configured to store write data from a host computer, and a storage controller configured to provide one or more volumes to the host computer, the storage controller performs the method comprising:

allocating, in response to receiving from the host computer a respective write request and respective write target data for a respective partition in a volume of the one or more volumes, a respective storage area of the one or more storage devices that has a same size as the respective partition to the respective partition, and storing the respective write target data in the allocated first storage area;

recording a respective last write time, which is a time when a write request is last received from the host computer, for each respective partition within the volume;

detecting a respective partition that does not receive another write request for a predetermined time or more from the respective last write time;

performing a deduplication process on the detected partition in such a way that, of the data written to the detected partition, only data different from data already stored in the one or more storage devices is stored in the one or more storage devices;

wherein the deduplication process includes:

dividing the detected partition into a plurality of deduplication blocks, allocating, for each respective deduplication block, a respective data block that has a same size as the respective deduplication block, and managing mapping between the respective deduplication block and the respective data block, and wherein, when allocating a second data block to a second deduplication block of the deduplication blocks, in a case that the data written to the second deduplication block is identical to data stored in a first data block allocated to a first deduplication block of the deduplication blocks, allocating the first data block to the second deduplication block.

7. The method for controlling the storage system according to claim 6, wherein a state of each respective partition includes a first state which is a state in which the deduplication process is not performed, a second state which is a state in which the deduplication process is performed, and a third state which is a state in which the partition is returned from the second state to the state before the deduplication process is performed, and wherein the deduplication process includes:

when a deduplication ratio of the detected partition is less than a predetermined threshold as a result of the execution of the deduplication process on the detected partition having the first state, changing the state of the detected partition to the third state.

8. The method for controlling the storage system according to claim 7, wherein the detected partition having the third state is not changed until another write request is issued from the host computer.

9. The method for controlling the storage system according to claim 8, further comprising:

when another write request is issued to the detected partition having the second state or the third state from the host computer, changing the state of the detected partition to the first state.

10. A non-transitory, computer-readable storage medium that records a program to be executed by a processor of a computer including one or more storage devices for storing write data,
wherein the program allows the processor to perform acts comprising:
allocating, in response to receiving from the host computer a respective write request and respective write target data for a respective partition in a volume, a respective storage area of the one or more storage devices that has a same size as the respective partition to the respective partition, and storing the respective write target data in the allocated respective storage area;
holding a respective last write time, which is a time when a write request is last received, for each respective partition within the volume;
detecting a respective partition that does not receive another write request for a predetermined time or more from the respective last write time;
performing a deduplication process on the detected partition in such a way that, of the data written to the detected partition, only data different from data already stored in the one or more storage devices is stored in the one or more storage devices;
wherein the deduplication process includes:
dividing the detected partition into a plurality of deduplication blocks,
allocating, for each respective deduplication block, a respective data block that has a same size as the respective deduplication block, and
managing mapping between the respective deduplication block and the respective data block, and
wherein, when allocating a second data block to a second deduplication block of the deduplication blocks, in a case that the data written to the second deduplication block is identical to data stored in a first data block allocated to a first deduplication block of the deduplication blocks, allocating the first data block to the second deduplication block.

11. The non-transitory, computer-readable storage medium according to claim 10,
wherein a state of each respective partition includes a first state which is a state in which the deduplication process is not performed, a second state which is a state in which the deduplication process is performed, and a third state which is a state in which the partition is returned from the second state to the state before the deduplication process is performed, and
wherein the deduplication process includes:
when a deduplication ratio of the detected partition is less than a predetermined threshold as a result of the execution of the deduplication process on the detected partition having the first state, changing the state of the detected partition to the third state.

12. The non-transitory, computer-readable storage medium according to claim 11,
wherein when another write request with respect to the detected partition having the second state or the third state is received, changing the state of the partition to the first state.

* * * * *